US009864077B2

(12) United States Patent
Sellinger et al.

(10) Patent No.: US 9,864,077 B2
(45) Date of Patent: Jan. 9, 2018

(54) BORON CONTAINING ORGANIC/HYBRID SCINTILLATION MATERIALS FOR GAMMA AND NEUTRON DETECTION

(71) Applicants: Alan Sellinger, Golden, CO (US); Uwe Greife, Golden, CO (US); Henok Yemam, Golden, CO (US); Adam Mahl, Denver, CO (US)

(72) Inventors: Alan Sellinger, Golden, CO (US); Uwe Greife, Golden, CO (US); Henok Yemam, Golden, CO (US); Adam Mahl, Denver, CO (US)

( * ) Notice: Subject to any disclaimer, the term of this patent is extended or adjusted under 35 U.S.C. 154(b) by 0 days.

(21) Appl. No.: 14/973,318

(22) Filed: Dec. 17, 2015

(65) Prior Publication Data

US 2016/0178766 A1    Jun. 23, 2016

Related U.S. Application Data

(60) Provisional application No. 62/093,136, filed on Dec. 17, 2014.

(51) Int. Cl.
*G01T 5/00* (2006.01)
*G01T 3/06* (2006.01)

(52) U.S. Cl.
CPC ..................... *G01T 3/06* (2013.01)

(58) Field of Classification Search
CPC ......... G01T 3/06; G01T 1/203; G01T 1/2033; G01T 1/20; G01T 3/00; G01T 1/2042; G01T 1/2023
USPC ...................................................... 250/473.1
See application file for complete search history.

(56) References Cited

U.S. PATENT DOCUMENTS

| | | | |
|---|---|---|---|
| 2,880,326 A | 3/1959 | Musicant | |
| 6,544,442 B1* | 4/2003 | Bell | C07F 9/11 252/301.17 |
| 7,067,079 B2* | 6/2006 | Bross | B29C 47/0073 264/109 |
| 7,372,041 B1* | 5/2008 | Nagarkar | G01T 3/06 250/390.11 |
| 7,723,114 B1* | 5/2010 | Coates, Jr. | C09K 11/565 436/57 |
| 7,985,868 B1* | 7/2011 | Bauer | C09K 11/04 549/523 |
| 9,121,947 B2* | 9/2015 | Nikolic | G01T 3/00 |
| 2004/0104500 A1* | 6/2004 | Bross | B29C 47/0073 264/85 |
| 2005/0208290 A1* | 9/2005 | Patel | C09K 11/06 428/323 |
| 2006/0054863 A1* | 3/2006 | Dai | B82Y 10/00 252/301.4 R |
| 2007/0205369 A1* | 9/2007 | Huth | G01T 1/203 250/368 |
| 2009/0318680 A1* | 12/2009 | Vicente | C07D 487/22 540/145 |

(Continued)

OTHER PUBLICATIONS

U.S. Appl. No. 14/452,007, filed Aug. 5, 2014, Pecinovsky.

(Continued)

*Primary Examiner* — Taeho Jo
(74) *Attorney, Agent, or Firm* — Sheridan Ross P.C.

(57) ABSTRACT

The invention is directed to a method for making a boron containing compound, a method for making a plastic scintillator and a method for forming a neutron detecting material, and the materials made therein. Methods of use are also disclosed.

20 Claims, 21 Drawing Sheets

(56) References Cited

U.S. PATENT DOCUMENTS

| | | | | |
|---|---|---|---|---|
| 2010/0092363 A1* | 4/2010 | Graeve | ............ | B82Y 30/00 423/263 |
| 2013/0187056 A1* | 7/2013 | Nikolic | ............ | G01T 3/008 250/370.05 |
| 2013/0270443 A1 | 10/2013 | Dijkstra et al. | | |
| 2014/0042330 A1* | 2/2014 | Gozani | ............ | G01T 1/203 250/367 |
| 2014/0151567 A1* | 6/2014 | Slaughter | ............ | G01T 3/001 250/367 |
| 2014/0346400 A1* | 11/2014 | Pei | ............ | C08F 2/02 252/301.18 |
| 2015/0232387 A1* | 8/2015 | Lambertin | ............ | C04B 28/006 106/807 |
| 2016/0017220 A1* | 1/2016 | Hamel | ............ | C08K 5/353 250/362 |
| 2016/0145214 A1* | 5/2016 | Douce | ............ | C07D 233/58 250/362 |

OTHER PUBLICATIONS

Bao et al., "Water-Soluble Hyperbranched Polyelectrolytes with High Fluorescence Quantum Yield: Facile Synthesis and Selective Chemosensor for Hg2+ and Cu2+ Ions," Journal of Polymer Science Polymer Chemistry, 2010, vol. 48(15), pp. 3431-3439, 2 page, abstract only.

Bell et al., "Boron-loaded silicone rubber scintillators," IEEE Transactions on Nuclear Science, 2004, vol. 51(4), pp. 1773-1776, 1 page, abstract only.

Bell et al., "Organic scintillators for neutron detection," SPIE, 2003, 1 page, abstract only.

Drake et al., "New electronically black neutron detectors," Nuclear Instruments and Methods in Physics Research Section A: Accelerators, Spectrometers, Detectors and Associated Equipment, 1986, vol. A247(3), pp. 576-582 (1986), 1 page, abstract only.

Drake et al., "New electronically black neutron detectors," Los Alamos National Laboratory, LA-10611, 1986, retrieved from http://www.iaea.org/inis/collection/NCLCollectionStore/_Public/17/078/17078930.pdf, retrieved on Apr. 22, 2016, 17 pages.

Geny et al., "Cobalt(I)-mediated preparation of polyborylated cyclohexadienes: Scopte, limitations, and mechanistic insight," Chemistry A European Journal, 2007, vol. 13(19), pp. 5408-5425, 2 page, abstract only.

Iannazzo et al., "Alkynylboronates and -boramides in Col- and Rhl-Catalyzed [2+2+2] Cycloadditions: Construction of Oligoaryls through Selective Suzuki Couplings," European Journal of Organic Chemistry, 2011, vol. 2011(18), pp. 3283-3292, 2 page, abstract only.

Liu et al., "Synthesis and properties of starburst amorphous molecules: 1,3,5-tris(1,8-naphthalimide-4-yl)benzenes," Synthetic Metals, 2010, vol. 160(19-20), pp. 2055-2060, 1 page, abstract only.

Matsumoto et al., "A kinetically protected pyrene: molecular design, bright blue emission in the crystalline state and aromaticity relocation in its dicationic species," Chemical Communications, 2014, vol. 50(75), pp. 10956-10958, 2 pages, abstract only.

Meijer et al., "Towards Compact Antineutrino Detectors for Safeguarding Nuclear Reactors," IAEA Report, IAEA-CN-184/74, 2010, 6 pages.

Pla-Dalmau et al., "Low-cost extruded plastic scintillator," Nuclear Instruments and Methods in Physics Research Section A, 2001, vol. 466, pp. 482-491.

Seven et al., "M. High-Yield Syntheses and Reactivity Studies of 1,2-Diborylated and 1,2,4,5-Tetraborylated Benzenes," Organometallics, 2014, vol. 33(5), pp. 1291-1299, 1 page, abstract only.

Official Action for U.S. Appl. No. 14/452,007, dated Dec. 9, 2015, 11 pages.

* cited by examiner

B, 7.11

B, 7.1

BORON CONTAINING ORGANIC/HYBRID SCINTILLATION MATERIALS FOR GAMMA AND NEUTRON DETECTION

CROSS REFERENCE TO RELATED APPLICATIONS

This application claims priority under 35 U.S.C. §119(e) to U.S. Provisional Patent Application Ser. No. 62/093,136 filed on Dec. 17, 2014, which is incorporated herein in its entirety by reference.

GOVERNMENT LICENSE RIGHTS

This invention was made with government support under grant numbers DHS-14-DN-077-ARI-NC7 awarded by the Domestic Nuclear Detection Office (DNDO)-National Science Foundation (NSF) Academic Research Initiative (ARI), and HDTRA1-11-1-0025 awarded by the Defense Threat Reduction Agency (DTRA). The Government has certain rights in the invention.

FIELD OF THE INVENTION

This invention includes a method to produce low cost detector materials that provide both neutron and gamma detection while achieving high discrimination between gammas and neutrons and the materials produced using the method. The invention also includes methods to use the materials.

BACKGROUND

Plastic scintillators are polymer-based detector materials for gamma radiation, fast neutrons and other charged particles. Scintillators generate a flash of light when ionizing radiation is absorbed (gamma, alpha, and/or neutron) (herein collectively "neutron"). Their low cost, fast-timing resolution and ease of large-scale production make it a first-line detection method compared to inorganic crystal scintillators. However, due to the absence of high neutron capture isotopes in plastic scintillators, they are unable to detect thermal neutrons and are therefore concurrently used with $^3$He gas detectors, for example, to detect illicit trafficking of special nuclear materials (SNM). Due to $^3$He scarcity and increasing demand, alternative isotopes such as $^{10}$B and $^6$Li with comparable thermal neutron capture cross sections and higher natural abundances have been investigated. Current developments of neutron sensitive plastic scintillators mainly rely on commercially available carboranes as a boron source due to their high boron content. Thermal neutrons are detected via the capture reaction on the nucleus of $^{10}$B and measuring the scintillation light produced by the alpha particles ($^4$He) released by this reaction, shown in equation (1). Although carboranes have high boron content (~75% wt.), they have limited solubility in plastic scintillator formulations, are very expensive, and the cost is significantly higher in their $^{10}$B enriched form.

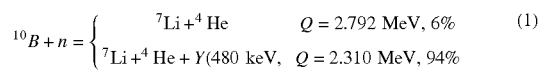

$$^{10}B + n = \begin{cases} ^7Li + ^4He & Q = 2.792 \text{ MeV, } 6\% \\ ^7Li + ^4He + \gamma(480 \text{ keV}), & Q = 2.310 \text{ MeV, } 94\% \end{cases} \quad (1)$$

Alternative methods of thermal neutron detection include boron containing semiconductor crystals, enriched boron-10 fluoride ($^{10}$BF$_3$) gas filled proportional counters, and boron lined tube counters along with liquid scintillators doped with boron compounds such as trimethyl borate. However, growing crystals in large quantities for significant area coverage is difficult and $^{10}$BF$_3$ has severe limitations in deployment due to its toxicity. While boron lined tubes are physically similar to $^3$He tubes, they suffer from reduced efficiencies due to the energy loss effects from having a solid boron wall coverage. Trimethyl borate mixed into liquid scintillators of many varieties has a very low flash point and is required to be very well sealed from oxygen in order to reduce quenching effects and maintain efficiency. Other isotopic candidates for scintillators such as $^6$Li or $^{155}$Gd/$^{157}$Gd are not attractive due to higher cost, lack of availability, and reduced compatibility with inexpensive polymer matrices. Furthermore, the price of substitute matrices needs to be comparable to that of the polymers in order to achieve neutron sensitivity in a cost effective manner. Alternatives to carboranes need to be produced with efficient synthesis methods and inexpensive reagents.

With regard to boron containing organic materials, recently direct borylation of activated C—H bonds of aromatic compounds has been reported using iridium-based catalysis. However, high Ir catalyst loadings, lack of regioselectivity and longer reaction times hinder its applicability and scale up potential. In order to counter these disadvantages, the synthesis of 1,3,6,8 tetrakis(4,4,5,5-tetramethyl-1,3,2-dioxaborolan-2-yl) pyrene was reported by Matsumoto and coworkers by nickel catalyzed direct borylation achieving a yield of 74% in two days (Matsumoto, A. et al. A kinetically protected pyrene: molecular design, bright blue emission in the crystalline state and aromaticity relocation in its dicationic species. *Chem Commun* 50, 10956-10958 (2014)). Furthermore, synthesis of 1,2,4,5-tetrakis(4,4,5,5-tetramethyl-1,3,2-dioxaborolan-2-yl)benzene was reported by Wagner and coworkers with an overall yield of 64%; however, their synthetic process was a two-step reaction system achieving only partial borylation and the use of highly pyrophoric and toxic reagents such as n-butyl lithium and Grignard reagents. Seven, O., et al., M. High-Yield Syntheses and Reactivity Studies of 1,2-Diborylated and 1,2,4,5-Tetraborylated Benzenes. Organometallics 33, 1291-1299 (2014). Both Aubert et al. (Geny, A. et al. Cobalt(I)-mediated preparation of polyborylated cyclohexadienes: Scope, limitations, and mechanistic insight. Chem-Eur J 13, 5408-5425 (2007)) and Gandon et al. (Iannazzo, L. et al., Alkynylboronates and -boramides in Co—I— and Rh—I Catalyzed [2+2+2] Cycloadditions: Construction of Oligoaryls through Selective Suzuki Couplings. Eur J Org Chem, 3283-3292 (2011). doi: 10.1002/ejoc.201100371) utilized cobalt-catalyzed [2+2+2] cycloaddition of ethynyl pinacol borate to yield a mixture of 2,2',2"-(benzene-1,2,4-triyl)tris (4,4,5,5-tetramethyl-1,3,2-dioxaborolane) and 1,3,5-tris(4,4,5,5-tetramethyl-1,3,2-dioxaborolan-2-yl)benzene with a yield of 63%. Their use of an expensive borylating reagent (ethynyl pinacol borate—$650/g) and a difficult separation of the product mixture could be detrimental to using this reaction system. Compared to cobalt-catalyzed cycloaddition reactions, Wang et al. achieved 85% yield by direct borylation of 1,3,5-tribromobenzene using Miyuara conditions. Bao, B. et al., Water-Soluble Hyperbranched Polyelectrolytes with High Fluorescence Quantum Yield: Facile Synthesis and Selective Chemosensor for Hg2+ and Cu2+ Ions. *J Polym Sci Pol Chem* 48, 3431-3439 (2010); Liu, Y. W. et al, Synthesis and properties of starburst amorphous molecules: 1,3,5-tris(1,8-naphthalimide-4-yl)benzenes. *Synth Met* 160, 2055-2060 (2010).

The present invention addresses and overcomes these and other issues, and more specifically provides a cost effective composition and method of making a scintillator for neutron and gamma detection for use in a number of industrial applications.

SUMMARY

The invention relates to neutron sensitive dopants and methods of making the same. The materials produced using the method described herein contain a relatively high boron content, good solubility and stability, and efficient photoluminescent (PL) properties for scintillation. A select group of proposed materials are illustrated in FIG. 1.

The invention also relates to a method to produce low cost detector materials that provide both neutron and gamma detection while achieving high discrimination between gammas and neutrons so that the materials can be used for replacement of 3-He based detectors and other commercial plastic products based on 10-B (goal~$1/g or ~$1000/liter) and the materials produced there-from. The materials made by this invention include highly fluorescent organic moieties that are chemically incorporated into a polymer matrix; boron (10-B) containing materials that can act as neutron detection groups; and highly fluorescent molecules that can be physically mixed into a polymer matrix.

The boron content can be adjusted from about 8.5% for compound 1 (commercially available), to about 6.1% for the highly photoluminescent pyrene compound 4 illustrated in FIG. 1.

All the precursor reactants are inexpensive. FIGS. 2A and 2B illustrate general reaction chemistries using different starting materials and several potential reactants for X and R. FIGS. 2A and 2B utilize microwave heating conditions, though traditional heating conditions can also be utilized. Another example of the Suzuki reaction chemistry for the formation of a compound using suitable starting materials is illustrated in FIG. 2C. The reactions in FIGS. 2A, 2B and 2C all use a palladium catalyst, but other suitable catalysts can be used.

At the core of nearly every approach for the detection of special nuclear materials are neutron sensitive detectors. Due to the scarcity of 3-He gas, the use of 3-He proportional counters, that provided excellent gamma suppression and thereby high accuracy in neutron field characterization, will become impossible for widespread deployment.

The borylation of multi-halo functionalized benzene and pyrene (aromatic) derivatives are produced using the very efficient and mature Suzuki chemistry to afford soluble materials with boron content as high as about 7.43 wt %. Furthermore some of these materials also have strong blue luminescence properties that may contribute to scintillation efficiency for detecting both gamma and neutron radiation. Examples of polymer-based scintillators using these new materials demonstrate highly efficient scintillation and thermal neutron detection.

Among the most promising alternatives for cost effective detection systems are organic scintillators that can provide neutron-gamma discrimination through the following means:

a) Pulse shape discrimination; possible in liquid scintillators with fluorescent dopants at the about 1% level and can be achieved in plastic scintillators by increasing fluorescent doping to between about 15-30%.

b) Characteristic neutron capture signal in the detector; achieved through addition of isotopes with a high neutron capture cross-section and detection of the resulting energy release.

c) Range discrimination; through the use of scintillator fiber bundles with individual readouts where particles from neutron capture reaction range out in the individual fiber while gamma induced fast neutrons deposit only part of their energy.

None of the above methods by itself provides sufficient neutron gamma separation to replace 3-He counters. Every approach pursued therefore has to rely on the addition of isotopes of a neutron sensitive isotope to the liquid or plastic base scintillators. In order to achieve the same neutron detection efficiencies, one has to provide the same number of neutron capture nuclei (weighted by cross section) as are confined in a typical 3-He tube. Table 1 illustrates the reactions/isotopes of interest and the associated neutronics. Reaction products, absorption cross sections (probabilities) and Q values (energetics) are detailed.

TABLE 1

| | | |
|---|---|---|
| -3-He(n,p)t | sigma (thermal) = 5300 barn | Q = 0.765 MeV |
| -6-Li(n,t)alpha | sigma (thermal) = 940 barn | Q = 4.78 MeV |
| -10-B(n,alpha)7-Li | sigma (thermal) = 3800 barn | Q = 2.79 MeV |

Given the reaction cross sections, compared to a 10 atm filled 3-He tube, 10-B concentrations in liquid organic solutions or plastics of order 0.5% and 6-Li concentrations above 2% would be required, although requiring higher concentrations (which have not been achieved due to the difficult chemistry) 6-Li has the higher Q-value advantage as well as lighter ejectiles, which produces a stronger scintillation pulse better separated from the background. For the detection of fast neutrons, an additional discrimination method is used, namely the dual pulse requirement, where the fast neutron interaction (scatter) with protons in the scintillator produces a first light pulse while eventually the thermalized neutron capture on 6-Li and 10-B produces the second one. Here the thermalization time depends strongly on the concentration and cross section of the neutron sensitive isotope and determines the coincidence time window necessary to register the double pulse structure. The advantage lies with 10-B in this case due to the higher cross section and cost effective/feasible chemical methods to achieve higher concentrations of boron in an organic scintillator. Furthermore 10-B based organics/plastics are less susceptible to water uptake than 6-Li based organics/plastics that can lead to degradation of the radiation detection efficiency.

In order to achieve high neutron-gamma discrimination for both fast and thermal neutrons, the isotope doping needs to be combined with pulse shape discrimination. For the use of plastic scintillators, which is preferred to liquids in monitoring/scanning applications, it means that high fluorescent doping levels above about 15% also need to be added to the base material.

Components of the invention include:
10-B dopants in scintillator base materials;
10-B containing compounds (lower molecular weight to increase 10-B content) and add fluorescent function to reduce total amount of additives;
Prepare and characterize larger samples in prototype and commercial production;
Detector response simulation based on commercial production properties;

Large detector (liters) measurements with laboratory neutron sources; and

Determination of neutron gamma discrimination factor.

An aspect of the invention is a method for incorporating a neutron sensitive material into a second material, such as a plastic, to form an apparatus.

An aspect of the invention is a method of preparing a neutron sensitive material that is adapted to measure neutron or gamma radiation. The method includes providing a boron containing material, a dopant, comprising a scintillating fluorescent or scintillating phosphorescent and a plastic material and combining the boron containing material, the dopant, and the plastic material to form a clear mixture.

An aspect of the invention is a neutron sensitive dopant for use in neutron and gamma detection of the formula $C_xH_yB_zO_{2z}$.

An aspect of the invention is a method of detecting neutrons. The method includes exposing an object or area suspected of containing neutrons to an apparatus, wherein the apparatus comprises a plastic and neutron sensitive dopant comprising 10B, and detecting a level of neutrons present in the object or area.

DETAILED DESCRIPTION

Another aspect of the invention is a method to form the boron containing material. The boron containing material is formed by mixing a base compound with a boron starting material. Advantageously, by forming the boron containing material, the boron weight percentage in the neutron sensitive material can be adjusted.

Figure 1:
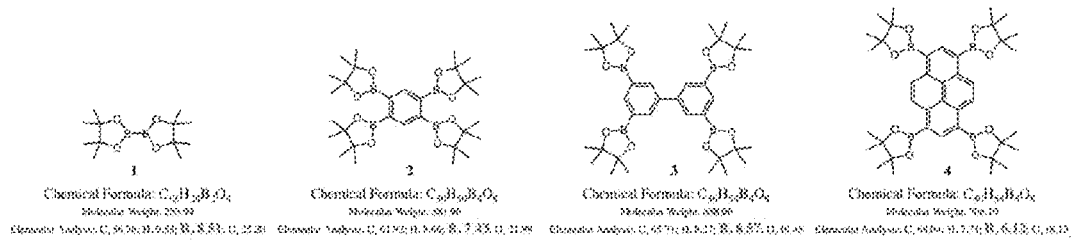
FIG. 1 illustrates select proposed materials of the present invention.
Figure 2A:
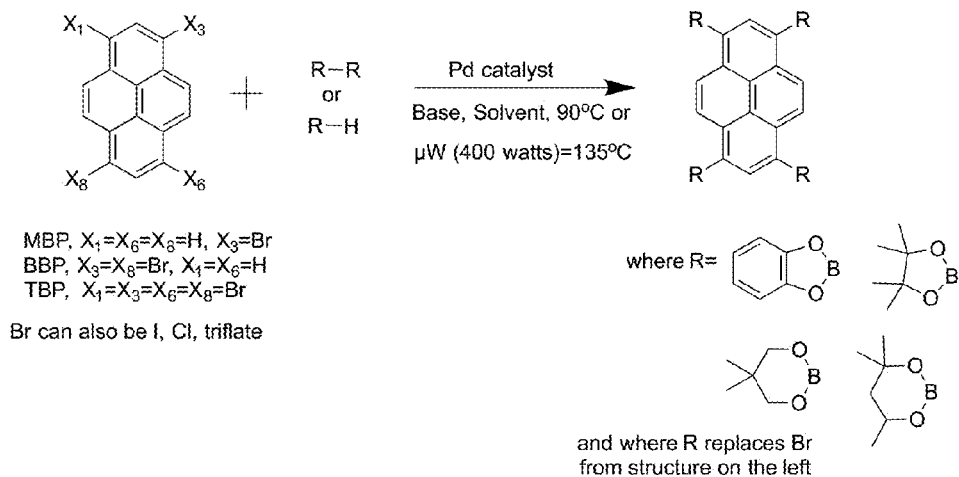
FIG. 2A illustrates an example of the general reaction chemistry for forming materials of the present invention.
Figure 2B:
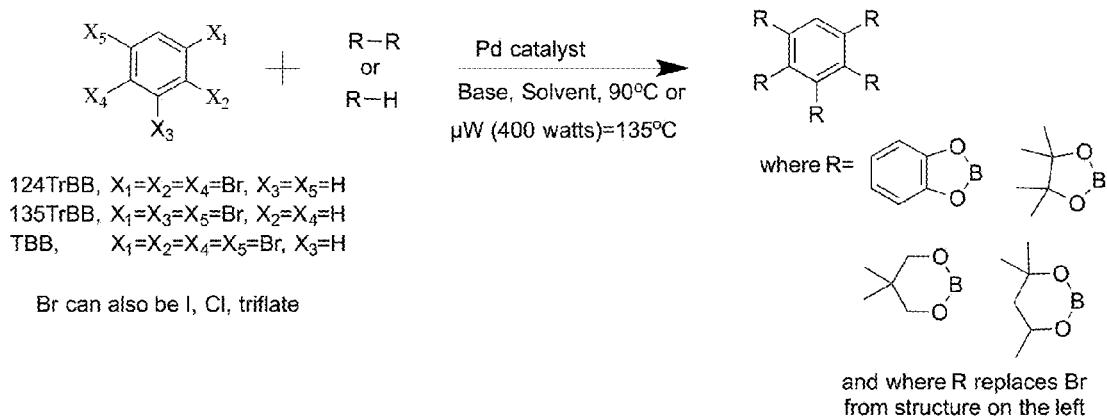
FIG. 2B illustrates another example of the general reaction chemistry for forming materials of the present invention.
Figure 2C:
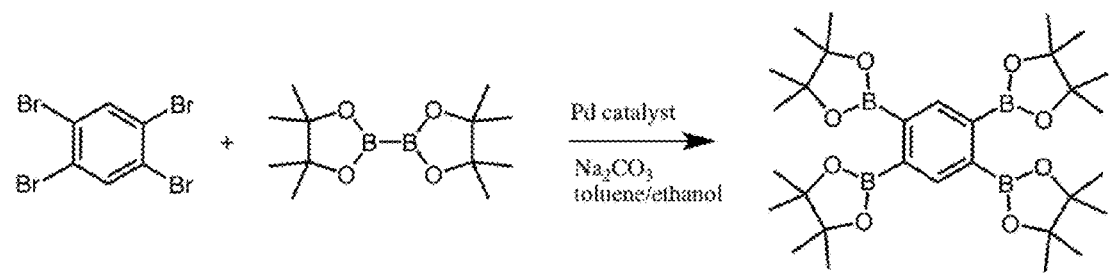
FIG. 2C illustrates an example of the Suzuki reaction chemistry used to prepare materials of the present invention.
Figure 3:
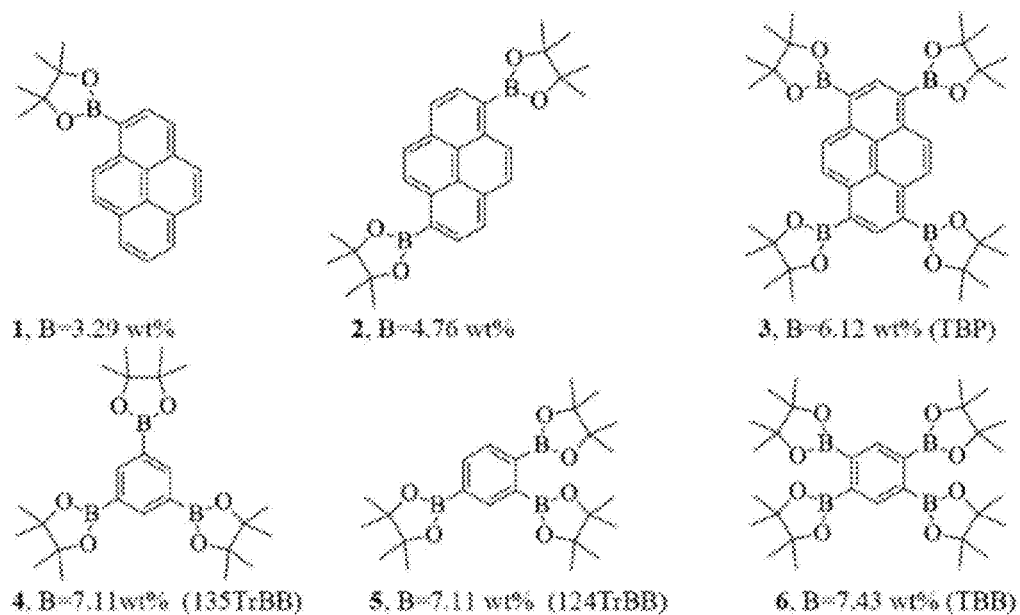
FIG. 3 illustrates suitable boron containing materials formed with a method of the invention.

A base compound, for example 1,2,4,5-tetrabromobenzene, can be mixed with a boron source, for example bispinacolato diborane ($B_2Pin_2$), in the presence of a catalyst to form a compound, for example $C_{30}H_{50}B_4O_8$. The reaction can take place in the presence of a solvent, such as toluene, ethanol, combinations thereof and in the presence of a base, such as sodium carbonate ($Na_2CO_3$). FIG. 3 illustrates suitable boron containing materials formed with a method of the invention.

The mixing occurs in the absence of oxygen. Thus, the mixture can occur in a nitrogen, argon, combinations thereof, or other inert gas environment.

The base compound and boron source can be dissolved in a solvent, for example 1,4-dioxane, toluene, tetrahydrofuran, N,N-dimethylformamide, and combinations thereof. The ratio of the base compound to the boron source is between about 1:5 to about 1:8. Slight excess equivalents of $B_2Pin_2$ can be used in the reaction. After the compound is dissolved, a base for example potassium acetate (KOAc) can be added quickly (within between 60 to 120 seconds) to the mixture followed by the addition of the catalyst. The mixture can be exposed to a temperature of between about 80° C. and about 95° C., in some embodiments about 90° C. Increasing the temperature can assist in completing these reactions in less than about 24 hours.

Figure 4:
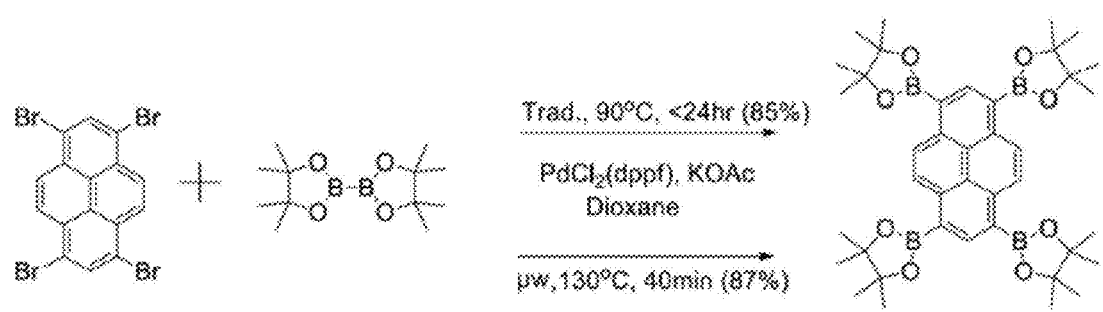
FIG. 4 illustrates conventional heading conditions (Trad.) and microwave (μW) heating conditions (MHC) for generating 1,3,6,8-tetrakis(4,4,5,5-tetramethyl-1,3,2-dioxaborolan-2-yl)pyrene (TBP)

FIG. 4 illustrates conventional heading conditions (Trad.) and microwave (μW) heating conditions (MHC) for generating tetra-borylated pyrene (TBP). Conditions for Trad. was between about 80° C. to about 95° C., in some embodiments about 90° C., for between about 12 hours to about 36 hours, in some embodiments about 24 hours which results in a reaction yield of between about 36% to about 97%, in some embodiments about 85%. In some embodiments, the mixture can be maintained at the temperature in a microwave (MHC). Conditions for MHC are at temperatures between about 120° C. to about 135° C., in some embodiments about 130° C., for between 30 minutes to about 45 minutes, in some embodiments about 40 minutes, and results in a reaction yield of between about 41% to about 85%, in some embodiments about 87%. The power of the microwave can be between about 300 W to about 400 W. In some embodiments, the mixture can be maintained at the temperature in an oven, or on a heating source.

The MHC resulted in similar reaction yields in much shorter reaction times (40 min vs. 24 hr) compared to the Trad. Furthermore, MHC, to the knowledge of the inventors, has not been demonstrated on multiple borylations (tri and tetra) in significantly reduced time frames (between about 40 minutes to about 60 minutes). Table 2 summarizes conditions and percentage yields between Trad. and MHC for multiple borylatation. Between about 3-4 mol % of a palladium catalyst was used to synthesize the samples in Table 3. Palladium catalyst in amounts of between about 0.5-5% mol % can also be used.

TABLE 2

| | $B_2Pin_2$ | KOAc | Yield (%) | |
|---|---|---|---|---|
| | (equiv) | (equiv) | MHC | Trad. |
| 1 | 1.5 | 3.0 | 68 | 75 |
| 2 | 3.0 | 6.0 | 63 | 79 |
| 3 | 6.0 | 10.0 | 85 | 87 |
| 4 | 4.5 | 7.5 | 61 | 69 |
| 5 | 4.5 | 7.5 | 83 | 97 |
| 6 | 6.0 | 10.0 | 41 | 36 |

FIG. 4 illustrates the applicability of the Trad. and MHC conditions to other aromatic molecules, related boron containing molecules that can be synthesized using lower catalyst loading, shorter reaction times, simpler purification methods, and comparable synthesis yields as previous literature methods. The boron weight percent for samples 1-6 from FIG. 4 are listed in Table 3. Detailed information about how these compounds were synthesized is discussed in the Example section.

TABLE 3

| Sample from FIG. 4 | Boron (weight %) |
|---|---|
| 1 | 3.29 |
| 2 | 4.76 |
| 3 | 3.12 |
| 4 | 7.11 |
| 5 | 7.11 |
| 6 | 7.43 |

A catalyst can be added to the mixture. Suitable catalysts include, but are not limited to, catalysts containing palladium, nickel, iridium, copper, ruthenium, and platinum and combinations thereof. Between about 1 to about 1.5 mol % of catalyst to the total weight of the mixture can be added to the mixture.

The reactions are generally quenched by exposing to ambient air conditions. The compound of interest, dissolved in the organic phase, can be washed with water, in some embodiments DI water to extract the aqueous phase from the compound. Brine, comprising water and sodium chloride, can be used to extract the compound in the organic layer to extract additional water from organic phase. The compound in the organic phase can be further dried from water, in some embodiments stirring with anhydrous $MgSO_4$ to form a slurry. The slurry can be separated from the compound in the organic layer using any suitable method, including filtration, centrifuge, or the like.

Examples of the resulting the boron containing compounds include TBP, 124TrBB, 135TrBB, TBB and the like.

One additional aspect of the invention is a method of preparing a neutron sensitive material. The method includes mixing all the materials of interest such as the boron containing material, the fluorescent materials and the plastic precursor, referred to as the monomer. The monomer is commonly styrene, 4-vinyltoluene, methyl methacrylate or the like. Sometimes an initiator is used that speeds up the conversion of the monomer to the plastic such as poly (styrene), poly(4-vinyltoluene), poly(methyl methacrylate) and the like. The mixture is heated to a temperature to convert the monomer to the plastic where the neutron sensitive material (boron containing material), and the fluorescent materials can be homogeneously dispersed as a clear solid plastic object.

The boron containing compound can include, but is not limited to, $B_2Pin_2$, 124TrBB and the like. One skilled in the art would understand that the boron containing compound can change the amount of boron in the neutron sensitive material. At least about 1.0 wt % of the boron containing compound in the plastic material enables neutron detection. In some embodiments, the amount of the boron containing compound can be up to about 15 wt. % and can result in a 10B weight percent of between 0.014 and 0.28. The neutron sensitive material can be included in other material (for example to form an apparatus), to detect neutrons in an area, apparatus, or on a person.

The plastic material can be poly(vinyl toluene), poly (styrene), and the like. The ratio of the boron containing material to the plastic material is between about 1:5 to about 1:99. Before the conversion of monomer to plastic, the monomer such as vinyl toluene or styrene can be purified to remove the inhibitor 4-tert-butylcatechol using a plug mixture of basic alumina with a small amount of potassium carbonate. By way of example only (and as one skilled in the art would understand), about 240 mL of styrene can be purified (to remove the 100 ppm 4-tert-butylcatechol inhibitor as received from the supplier) using about 200 g basic alumina with about 100 mg potassium carbonate.

The reaction occurs in the absence of oxygen (an inert environment), such as a nitrogen environment, an argon environment, a helium environment, and the like.

An aspect of the invention is a method of mixing a neutron sensitive material with a fluorescent material to form a plastic scintillator. The method comprises mixing between 1 wt. % to about 20 wt. % of a neutron sensitive material with between 1 wt. % to about 15 wt. % of a fluorescent material to form a plastic scintillator. The neutron sensitive material can be selected from the group consisting of $B_2Pin_2$ and 124TrBB. The fluorescent material can be 2,5-diphenyloxazole (PPO), 1,4-bis(5-phenyloxazol-2-yl) benzene (POPOP), 9,10-diphenylanthracene, (DPA) and combinations thereof. The resulting plastic scintillators comprise the neutron sensitive material and plastic.

Scintillators can be made by recrystallizing azobisisobutyronitrile (AIBN) from methanol twice and storing the AIBN in an air free freezer. The boron containing material can be dried in Buchi glass oven (model #B-585) at between about 35° C. to about 50° C., in some embodiments about 40° C., for between about 12 hours to about 36 hours, in some embodiments about 24 hours. The boron containing material can be stored in an air free atmosphere. Between about 0.1 wt. % to about 0.2 wt. %, in some embodiments about 0.1 wt. % of AIBN was used as initiator. After adding between about 1 to 20 wt. % PPO, between about 0.1 to about 0.2 wt. %, in some embodiments about 0.1 wt. % of POPOP or DPA, between about 1 wt. % to about 20 wt. % dried boron containing material, and between about 64.9 wt. % to 98.9 wt % in 120 ml (51×102 mm) ampoule, an inert gas, such as argon gas, can be bubbled in the reaction mixture prior to polymerization to prevent oxidative degradation. Polymerization can be completed in between about 4 days to about 5 days, in some embodiments about four days at between about 80° C. and about 90° C., in some embodiments about 80° C. The temperature in the reactor can be ramped to between about 90° C. to about 95° C., in some embodiments about 90° C. for between about 12 hours to about 24 hours, in some embodiments for an additional about 12 hours. This polymerization can be a chamber, such as a vacuum over (for example a Fischer Scientific isotemp vacuum oven (model #280A) in the presence of an inert gas.

The final product can be any suitable shape and a mold can be used to shape the final product. Due to the inherent stochastic nature of the polymerization, at least one face of the products can be machined and polished to achieve a flat smooth surface which allows for better coupling to the photodetector maximizing the samples capability for scintillation response. One skilled in the art would understand how to achieve a flat smooth surface with these materials.

An aspect of the invention is a neutron sensitive dopant for use in neutron and gamma detection. The dopant can comprise between $3.23 \times 10^{23}$ to $6.28 \times 10^{24}$ carbon atoms, between $1.08 \times 10^{23}$ to $1.39 \times 10^{24}$ hydrogen atoms, between $8.07 \times 10^{21}$ to $1.09 \times 10^{22}$ boron atoms and between $4.78 \times 10^{22}$ to $5.22 \times 10^{23}$ oxygen atoms.

In some embodiments, the neutron sensitive dopant can have a chemical formula of the dopant of $C_xH_yB_zO_a$. In some embodiments, the chemical formula of the neutron sensitive dopant can be $C_xH_yB_zO_{2z}$. In some embodiments, the chemical formula of the neutron sensitive dopant can be $C_{12}H_{24}B_2O_4$. The weight percent of the boron in the neutron sensitive dopant can be between about 3.29 to about 8.51. The neutron sensitive dopant can replace the use of $^3He$ in detector application. Thus, an embodiment of the dopant of the present invention does not include $^3He$.

Another aspect of the present invention is a method of detecting neutrons. The method includes exposing an object or area suspected of containing neutrons to an apparatus. The apparatus contains a neutron sensitive dopant comprising 10B. Neutrons present in the object or area can be detected with the apparatus. The apparatus can be used in any suitable application to detect the neutron, including but not limited to, oil and gas operations (including drilling, fracking, completing, and the like), a person, specialty materials (for example, special nuclear materials such as uranium or plutonium), reactor area, laboratories, cargo, or other areas where the presence of neutrons is known or suspected. The method can also be used to detect neutron and gamma signals in airport security, or neutron therapy, for example.

EXAMPLES

Synthesis and Analysis of Sample 1 in FIG. 4

Figure 5A:
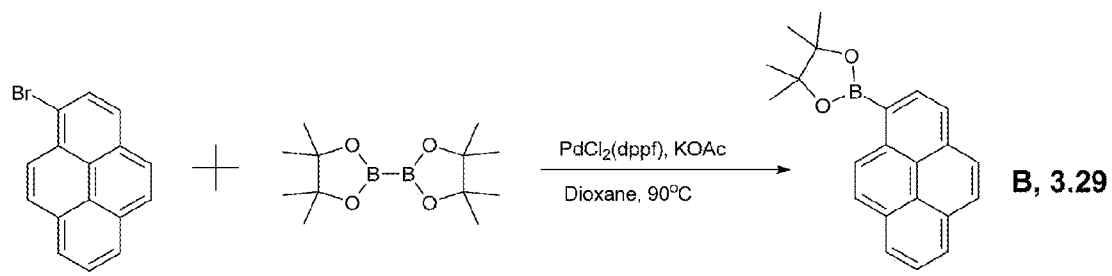
FIG. 5A illustrates the synthesis of 4,4,5,5-tetramethyl-2-(pyren-1-yl)-1,3,2-dioxaborolane.

FIG. 5A illustrates the synthesis of 4,4,5,5-tetramethyl-2-(pyren-1-yl)-1,3,2-dioxaborolane.

Trad. Conditions

In a flame-dried Schlenk tube under argon atmosphere, 1-bromopyrene (200 mg, 0.71 mmol) and $B_2Pin_2$ (270 mg, 1.07 mmol) were dissolved in 20 ml 1,4-dioxane. Flame dried KOAc (210 mg, 2.13 mmol) was added quickly to the mixture followed by $PdCl_2$ (dppf) (17 mg, 0.021 mmol). The mixture was heated at 90° C. overnight. Once the reaction was complete, the mixture was cooled to room temperature and 20-30 ml ethyl acetate was added to quench the reaction. 30 ml DI water was added to extract the aqueous phase, 30 ml brine (2×) was used to wash the organic phase, and it was dried over anhydrous MgSO4 and filtered. After concentrating down the filtrate, silica column chromatography with hexanes as eluent gave a yellow powder (175 mg, 75%). 1H NMR (300.0 MHz, CDCl3): δ 9.16 (d, 1H; CH), δ 8.02-8.28 (m, 7H; CH), δ 1.54 (s, 12H; CH3). 13C {1H} NMR (75.5 MHz, CDCl3): δ 124.02-136.41 (CH), δ 83.82 (CCH3), δ 25.00 (CH3), n.o. (CB).

Figure 5B:
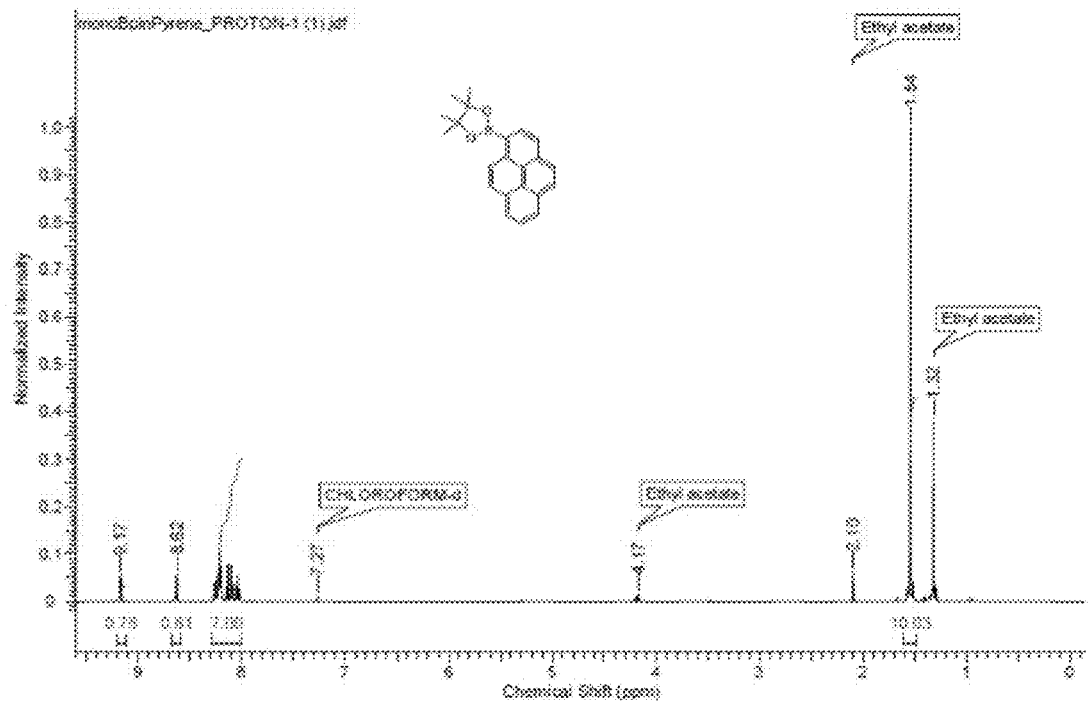
FIG. 5B illustrates $^1$H NMR results for the compound synthesized in FIG. 5A.
Figure 5C:
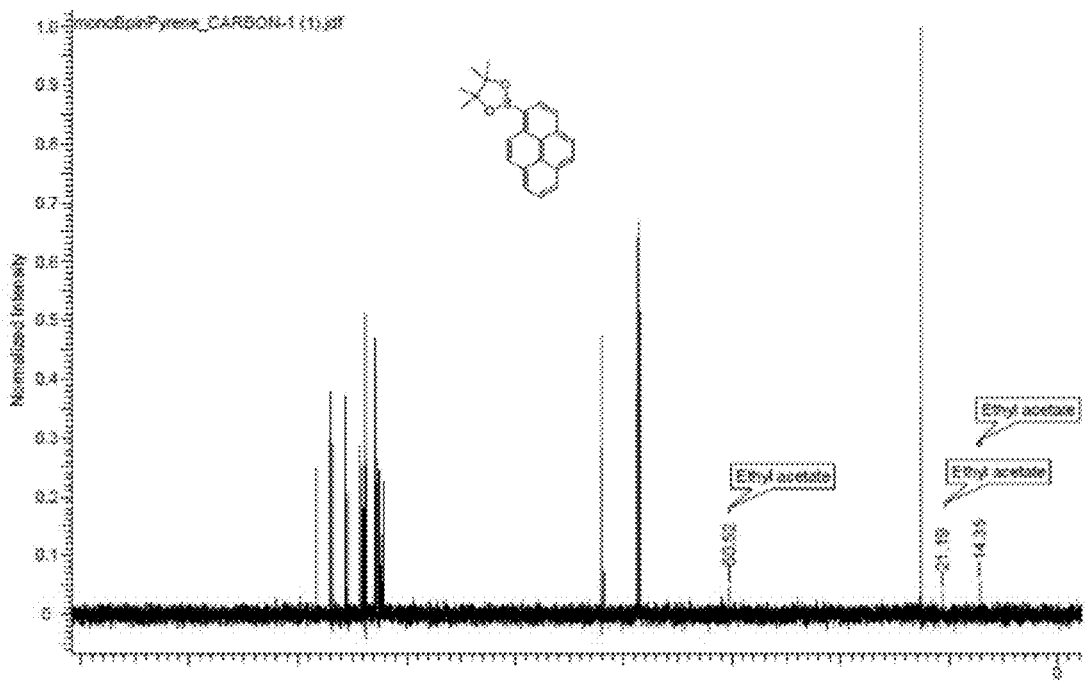
FIG. 5C illustrates $^{13}$C NMR results for the compound synthesized in FIG. 5A.

The synthesis of sample 1 in FIG. 4 was previously reported by Akhavan-Tafti et al. with a similar procedure to the Trad. synthesis (except 85° C., DMSO) affording approximately the same percent yield (Table 1). Both $^1H$ and $^{13}C$ NMR for sample 1 are illustrated in FIGS. 5B and 5C, respectively. MHC show similar NMR signals as illustrated in FIGS. 5B and 5C.

MHC 1-bromopyrene (500 mg, 1.78 mmol) and B2Pin2 (678.0 mg, 2.67 mmol) were added to a 20 ml microwave flask. Flame dried KOAc (524 mg, 5.33 mmol) and PdCl2(dppf) (58 mg, 0.071 mmol) were added quickly to the flask. After adding 12 ml 1,4-dioxane, the flask was capped tightly and run at 130° C. for 40 min. Once the reaction was complete, the mixture was cooled to room temperature and 15 ml ethyl acetate was added to quench the reaction. 20 ml DI water was added to extract the aqueous phase and 20 ml brine (2×) was used to wash the organic phase. It was dried over anhydrous MgSO4 and filtered. After concentrating down the filtrate, silica column chromatography with hexanes as eluent gave a yellow powder (396 mg, 68%).

Synthesis and Analysis of Sample 2 in FIG. 4

Figure 6A:
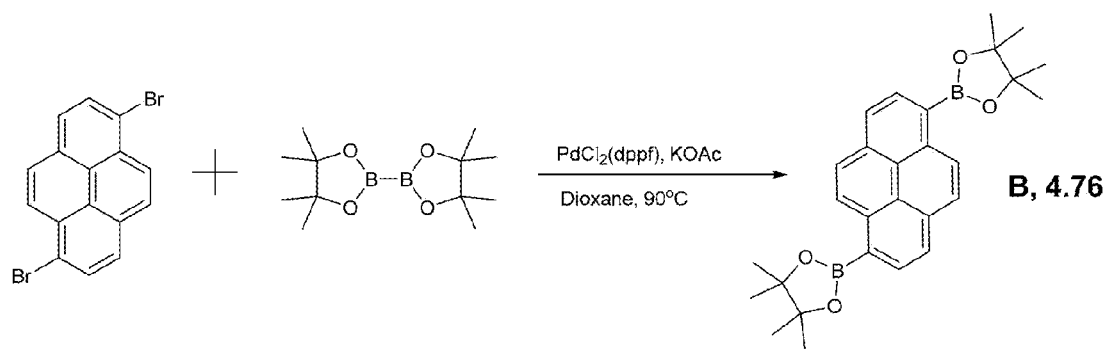
FIG. 6A illustrates the synthesis of 1,6-bis(4,4,5,5-tetramethyl-1,3,2-dioxaborolan-2-yl)pyrene.

FIG. 6A illustrates the synthesis of 4,4,5,5-tetramethyl-2-(pyren-1-yl)-1,3,2-dioxaborolane.

Trad. Conditions

In a flame-dried Schlenk tube under argon atmosphere, 1,6-dibrompyrene (200 mg, 0.56 mmol) and B2Pin2 (420 mg, 1.67 mmol) were dissolved in 20 ml 1,4-dioxane. Flame dried KOAc (327 mg, 3.32 mmol) was added quickly to the mixture followed by PdCl2(dppf) (13.6 mg, 0.017 mmol). The mixture was heated at 90° C. overnight. A scoop of catalyst (5 mg) was added to complete the reaction. Once the reaction was complete, the mixture was cooled to room temperature and 20-30 ml ethyl acetate was added to quench the reaction. 30 ml DI water was added to extract the aqueous phase, 30 ml brine (2×) was used to wash the organic phase, and it was dried over anhydrous MgSO4 and filtered. After concentrating down the filtrate, silica column chromatography with hexanes:dichloromethane (1:1) mixture as eluent gave a yellow powder (200 mg, 79%). 1H NMR (300.0 MHz, CDCl3): δ 9.12 (d, 2H; CH), δ 8.56 (d, 2H; CH), 3 δ 8.21 (d, 2H; CH), δ 8.15 (d, 2H; CH), δ 1.51 (s, 24H; CH3). 13C {1H} NMR (75.5 MHz, CDCl3): δ 133.77 (CH), δ 133.20 (CH), δ 129.22 (CH), δ 127.99, δ 124.55 (CH), δ 83.96 (CCH3), δ 25.12 (CH3), n.o. (CB). MALDI TOF MS: m/z 455 (M+), 353, 326 (M-Bpin)+.
MHC 1,6-dibromopyrene (500 mg, 1.39 mmol) and B2Pin2 (1.06 g, 4.17 mmol) were added to a 20 ml microwave flask. Flame dried KOAc (818 mg, 8.33 mmol) and PdCl2(dppf) (45.4 mg, 0.056 mmol) were added quickly to the flask. After adding 12 ml 1,4-dioxane, the flask was capped tightly and run at 130° C. for 40 min. Once the reaction was complete, the mixture was cooled to room temperature and 15 ml ethyl acetate was added to quench the reaction. 20 ml DI water was added to extract the aqueous phase and 20 ml brine (2×) was used to wash the organic phase. It was dried over anhydrous MgSO4 and filtered. After concentrating down the filtrate, silica column chromatography with a mixture of hexanes and dichloromethane (1:1) as eluent yielded a yellow powder (400 mg, 63%).

Figure 6B:
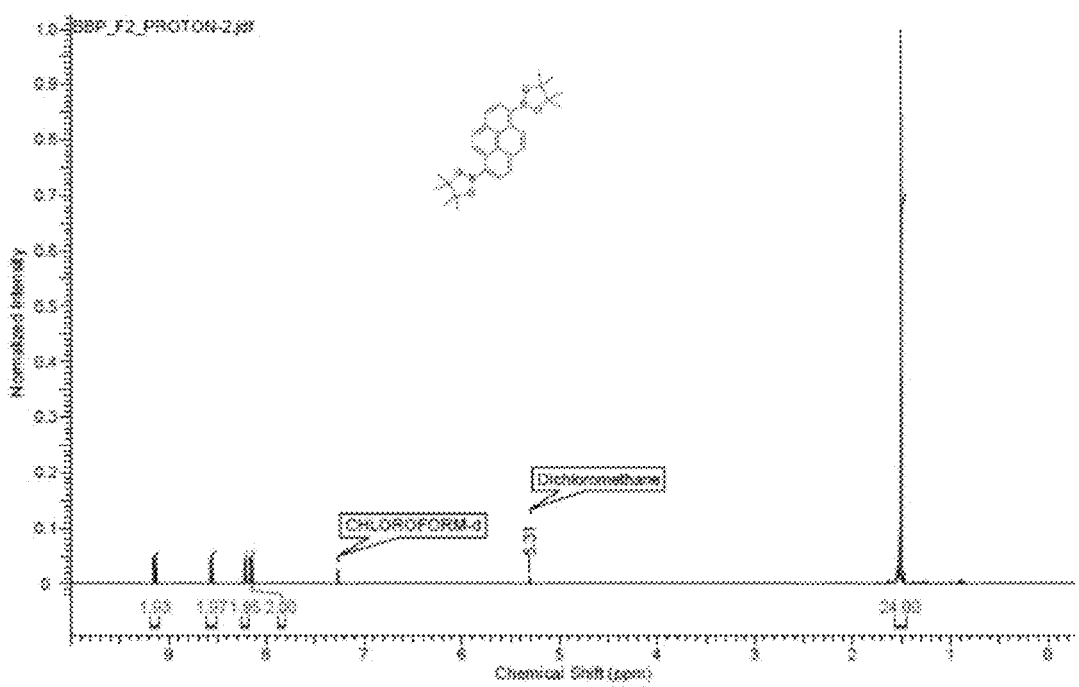
FIG. 6B illustrates $^1$H NMR results for the compound synthesized in FIG. 6A.
Figure 6C:
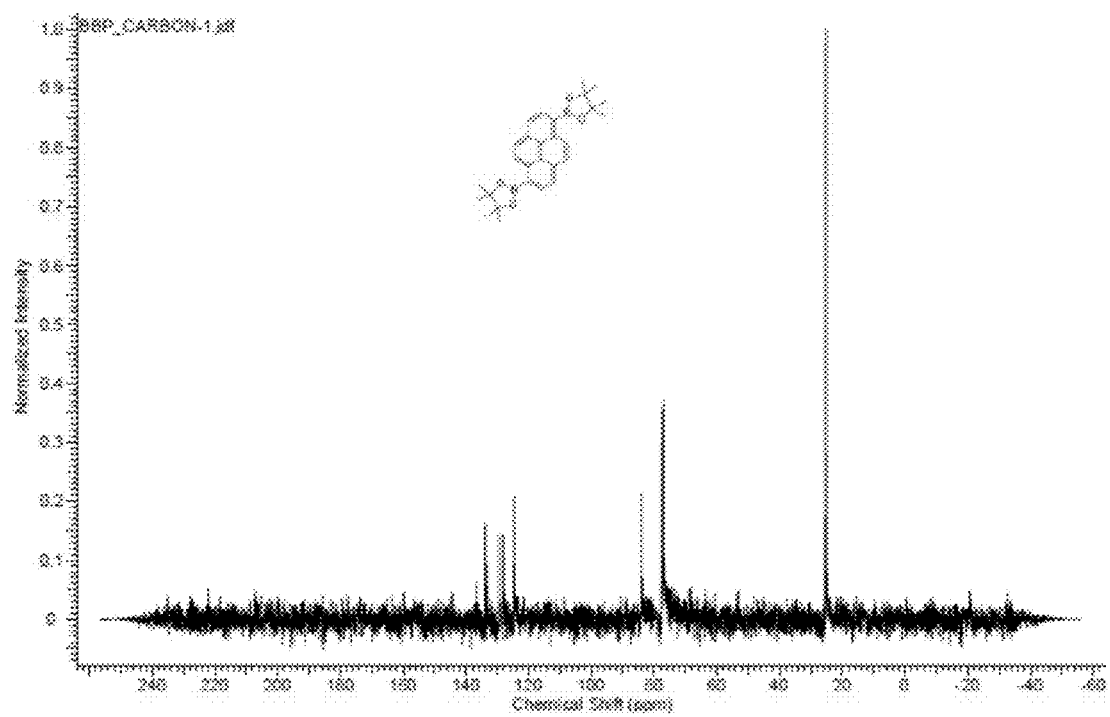
FIG. 6C illustrates $^{13}$C NMR results for the compound synthesized in FIG. 6A.
Figure 6D:
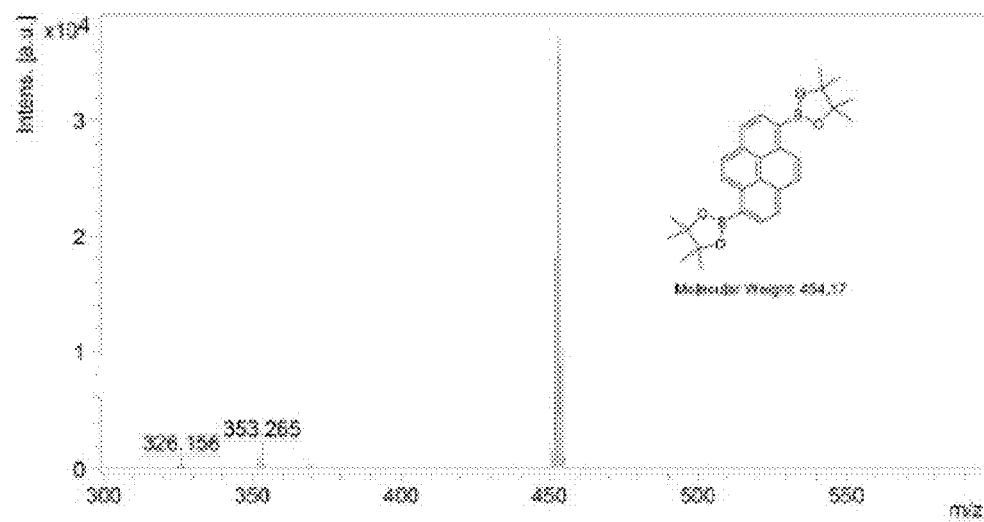
FIG. 6D illustrates MALDI TOF MS results for the compound synthesized in FIG. 6A.

Sample 2 in FIG. 4 illustrated the biggest drop in yield when attempting microwave borylation (79% vs 63%). Several attempts were made by varying temperature, amounts of catalyst and $B_2Pin_2$, and reaction time, however the microwave yield couldn't be improved. Both $^1H$ and $^{13}C$ NMR and MALDI TOF MS for this compound confirm the product purity and can be found in FIGS. 6B, 6C (NMR) and 6D, respectively.

Synthesis and Analysis of Sample 3 in FIG. 4
Trad. Conditions

In a flame-dried Schlenk tube under argon atmosphere, 1,3,6,8-tetrabromopyrene (500 mg, 0.97 mmol) and $B_2Pin$ (1.47 g, 5.79 mmol) were dissolved in 20 ml 1,4-dioxane. Flame dried KOAc (952 mg, 9.7 mmol) was added quickly to the mixture followed by $PdCl_2$ (dppf) (24 mg, 0.029 mmol). The mixture was heated at 90° C. overnight. At the 16 hr mark, 10 mg catalyst was added to complete the reaction. Once complete, the mixture was cooled to room temperature and 20-30 ml ethyl acetate was added to quench the reaction. 30 ml DI water was added to extract the aqueous phase, 30 ml brine (2×) was used to wash the organic phase, and it was dried over anhydrous $MgSO_4$ and filtered. After concentrating down the filtrate, silica column chromatography with hexanes:ethyl acetate (8:2) mixture as eluent gave a yellow powder (592 mg, 87%). MALDI TOF MS: m/z 707 (M+), 581 (M-Bpin)+, 454(M-2Bpin)+, 227 (M-3Bpin)+.
MHC 1,3,6,8-tetrabromopyrene (500 mg, 0.97 mmol) and $B_2Pin_2$ (1.48 g, 5.82 mmol) were added to a 20 ml microwave flask. Flame dried KOAc (952.0 mg, 9.70 mmol) and $PdCl_2$ (dppf) (31.5 mg, 0.039 mmol) were added quickly to the flask. After adding 12 ml 1,4-dioxane, the flask was capped tightly and run at 130° C. for 1 hr. Once the reaction was complete, the mixture was cooled to room temperature and 15 ml ethyl acetate was added to quench the reaction. 20 ml DI water was added to extract the aqueous phase and 20 ml brine (2×) was used to wash the organic phase. It was dried over anhydrous $MgSO_4$ and filtered. After concentrating down the filtrate, silica column chromatography with a mixture of hexanes and ethyl acetate (8:2) as eluent yielded a yellow powder (579 mg, 85%).

Figure 7:
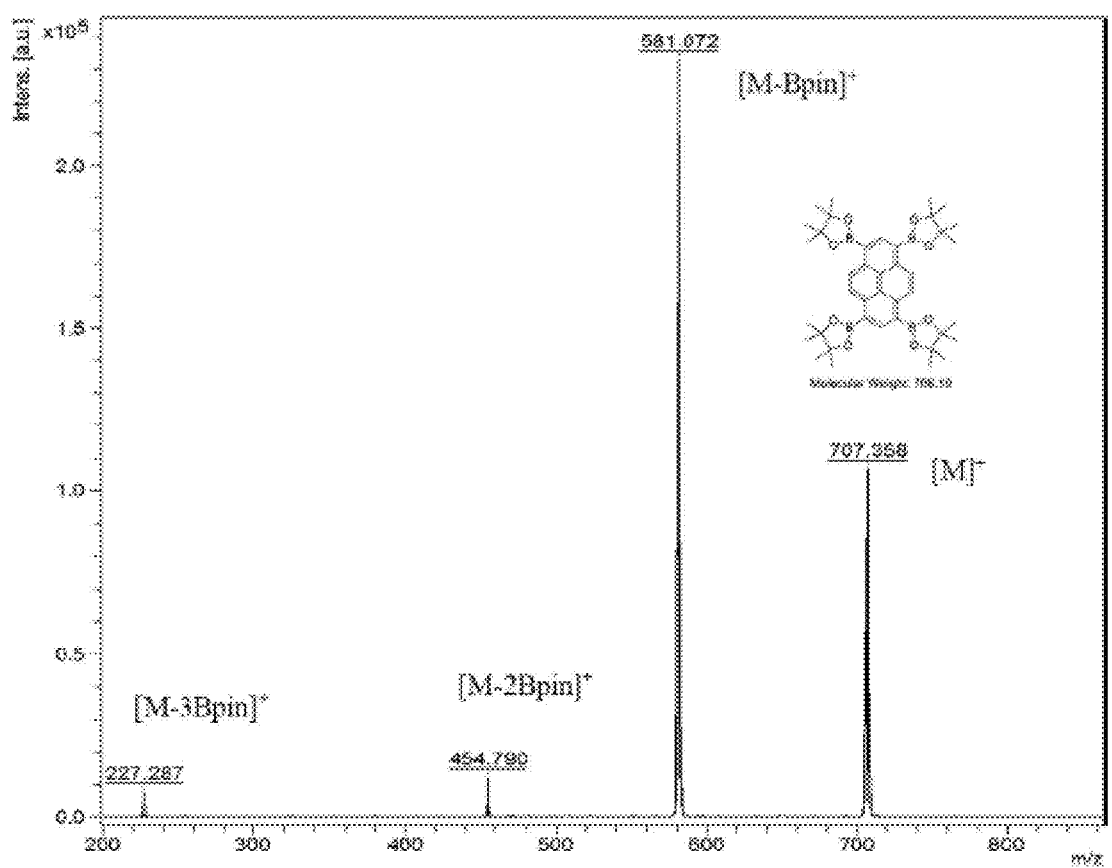
FIG. 7 illustrates MALDI TOF MS results for TBP.

The synthesis of TBP (illustrated in FIG. 3, and sample 3 in FIG. 4) appeared straightforward but the characterization was problematic as both $^1H$ and $^{13}C$ NMR were inconclusive, resulting in broad and featureless peaks in the aromatic region while showing definitive and clear peaks in the aliphatic region. Thus, the analysis was performed with MALDI TOF MS, which confirmed the molecule as illustrated in FIG. 7. By utilizing 1,8,9 trihydroxyanthracene as a matrix, all the possible fragments 707.4 (M+), 581.1, 454.8 and 227.3 Da were observed.

Figure 8:
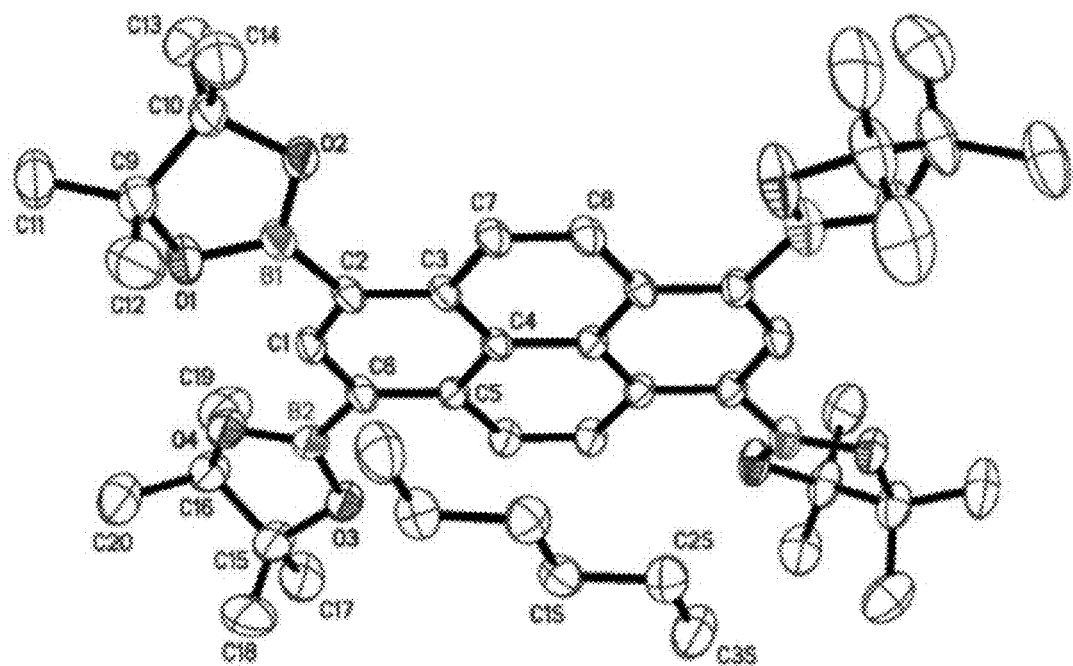
FIG. 8 illustrates the single crystal x-ray structure of TBP.

TBP crystals with dimensions of 1-2 mm were prepared by slow introduction of hexanes into a TBP chloroform solution. The crystals had suitable quality for single-crystal x-ray analysis, revealing TBP and n-hexane molecules each sitting on a 2-fold rotation axis as illustrated in FIG. 8. The pyrene ring system is essentially flat, but the Bpin rings are non-planar and disordered over two distinct conformations. The crystal structure of TBP coupled with MALDI illustrates that TBP was synthesized despite the inability to obtain conclusive $^1H$ and $^{13}C$ NMR.

Synthesis of Samples 4 and 5 in FIG. 4

The synthesis of 1,3,5-tris(4,4,5,5-tetramethyl-1,3,2-dioxaborolan-2-yl)benzene (135TrBB) and 2,2',2"-(benzene-1,2,4-triyl)tris(4,4,5,5-tetramethyl-1,3,2-dioxaborolane) (124TrBB) (FIG. 4, samples 4 & 5, respectively) had significance in determining if the symmetry of boron containing molecules could have an effect in the detection of thermal neutrons, especially because these two molecules have identical amounts of boron by mass (7.11%).

Figure 9A:
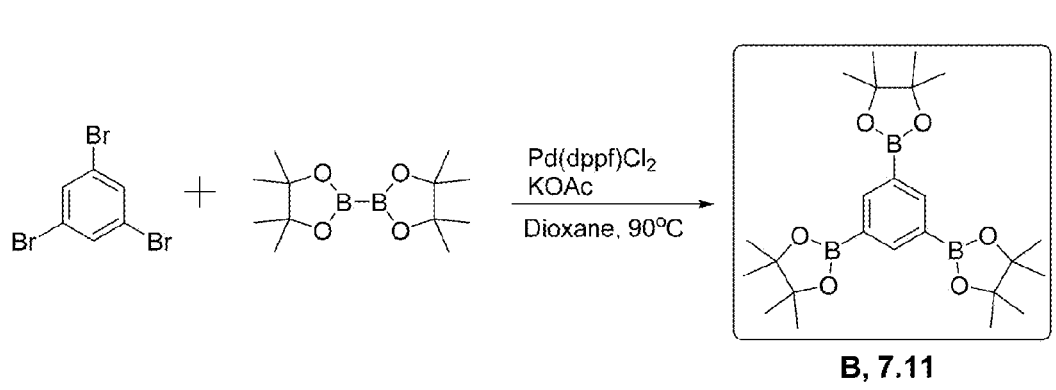
FIG. 9A illustrates the formation of 1,3,5-tris(4,4,5,5-tetramethyl-1,3,2-dioxaborolan-2-yl)benzene (135TrBB)

Sample 4
FIG. 9A illustrates the formation of 135TrBB.
Trad. Conditions

Figure 9B:
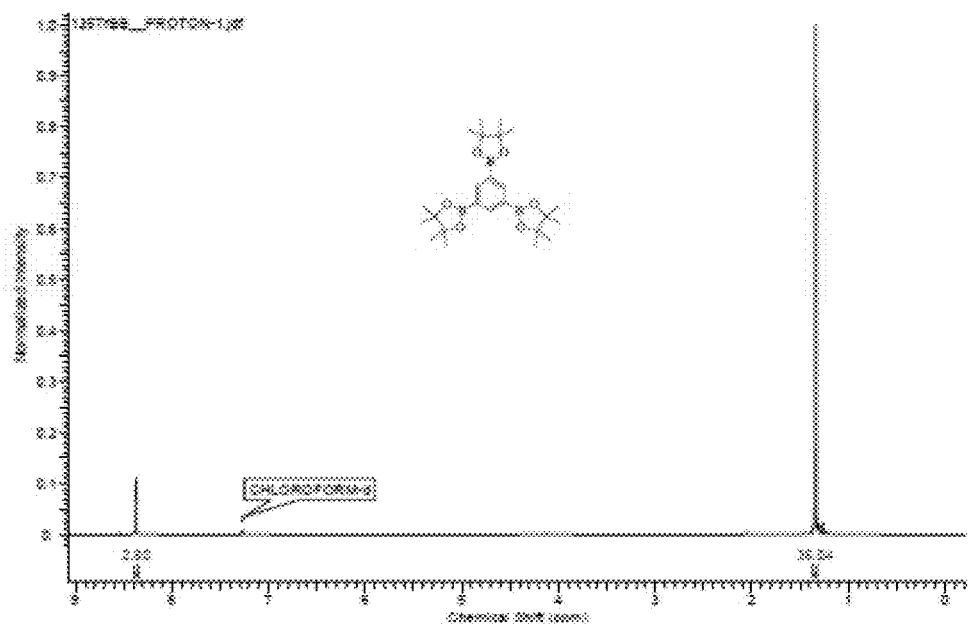
FIG. 9B illustrates $^1$H NMR results for 135TrBB.
Figure 9C:
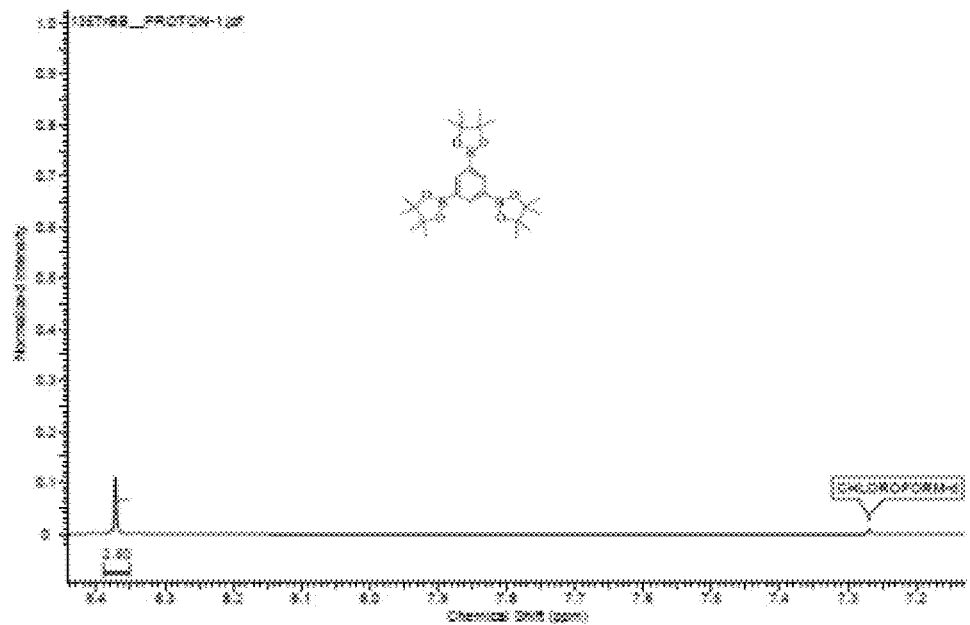
FIG. 9C illustrate illustrates $^1$H NMR results for 135TrBB.
Figure 9D:
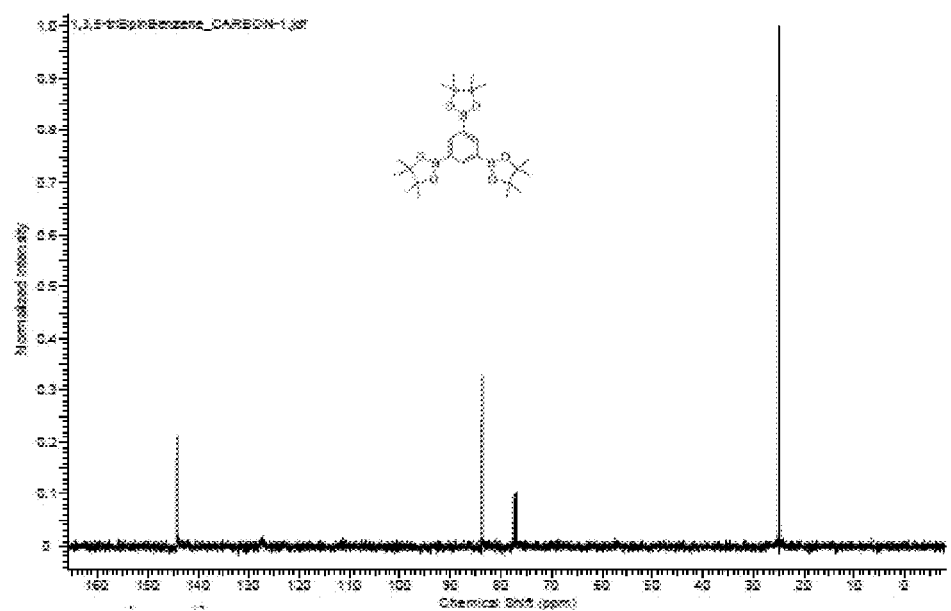
FIG. 9D illustrates $^{13}$C NMR results for 135TrBB.

In a flame-dried Schlenk tube under argon atmosphere, 1,3,5-tribromobenzene (200 mg, 0.64 mmol) and B2Pin2 (731.3 mg, 2.88 mmol) were dissolved in 20 ml 1,4-dioxane. Flame dried KOAc (471.1 mg, 4.8 mmol) was added quickly to the mixture followed by $PdCl_2$ (dppf) (15.5 mg, 0.029 mmol). The mixture was heated at 90° C. overnight. The progress of reaction was tracked by TLC (9 hexanes: 1 ethyl acetate) and visualization was achieved in an iodine chamber. Two spots (Rf 0.20 and Rf 0.25) were observed and heating was stopped and allowed to cool down to room temperature. 20-30 ml ethyl acetate was added to quench the reaction. 30 ml DI water was added to extract the aqueous phase and 30 ml brine (2×) was used to wash the organic phase, dried over anhydrous $MgSO_4$ and filtered. After concentrating down the filtrate, hexanes:ethyl acetate (9:1) mixture was used to elute Rf 0.25 in silica column chromatography to yield white powder [69%, 200 mg]. 1H NMR (300.0 MHz, CDCl3): δ 8.36 (s, 3H; CH), δ 1.32 (s, 36H; CH3). 13C {1H} NMR (75.5 MHz, CDCl3): δ144.14 (CH), δ 83.79 (CCH3), δ 24.96 (CH3), n.o. (CB).
MHC 1,3,5-tribromobenzene (500 mg, 1.59 mmol) and $B_2Pin_2$ (1.82 g, 7.15 mmol) were added to a 20 ml microwave flask. Flame dried KOAc (1.17 g, 11.9 mmol) and $PdCl_2$ (dppf) (52 mg, 0.064 mmol) were added quickly to the flask. After adding 12 ml 1,4-dioxane, the flask was capped tightly and run at 130° C. for 1 hr. TLC (9 hexanes: 1 ethyl acetate) showed there were two spots Rf 0.2 and Rf 0.25. The mixture was cooled to room temperature and 30 ml ethyl acetate was added to quench the reaction. 30 ml DI water was added to extract the aqueous phase, 30 ml brine (2×) was used to wash the organic phase, and it was dried over anhydrous $MgSO_4$ and filtered. After concentrating down the filtrate, hexanes:ethyl acetate (9:1) mixture was used to elute Rf 0.25 by silica column chromatography to yield white powder (440 mg, 61%). FIGS. 9B and 9C illustrate $^1H$ NMR results for 135TrBB and FIG. 9D illustrate illustrates $^{13}C$ NMR results for 135TrBB.

Sample 5

Figure 10A:
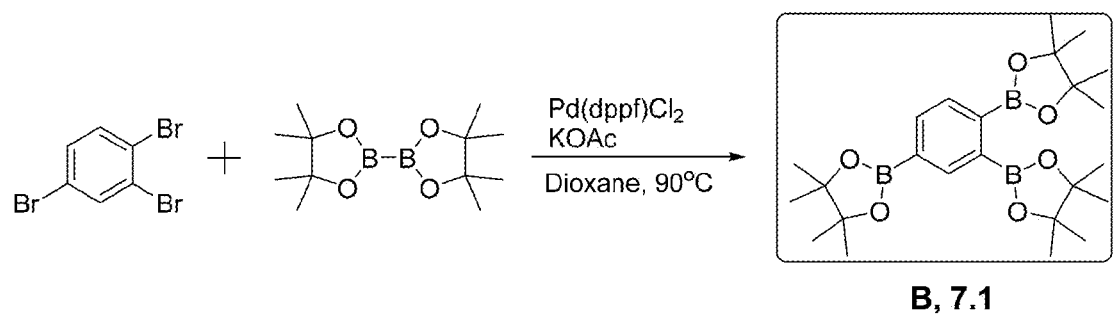
FIG. 10A illustrates the formation of 1,2,4-tris(4,4,5,5-tetramethyl-1,3,2-dioxaborolan-2-yl)benzene.
Figure 10B:
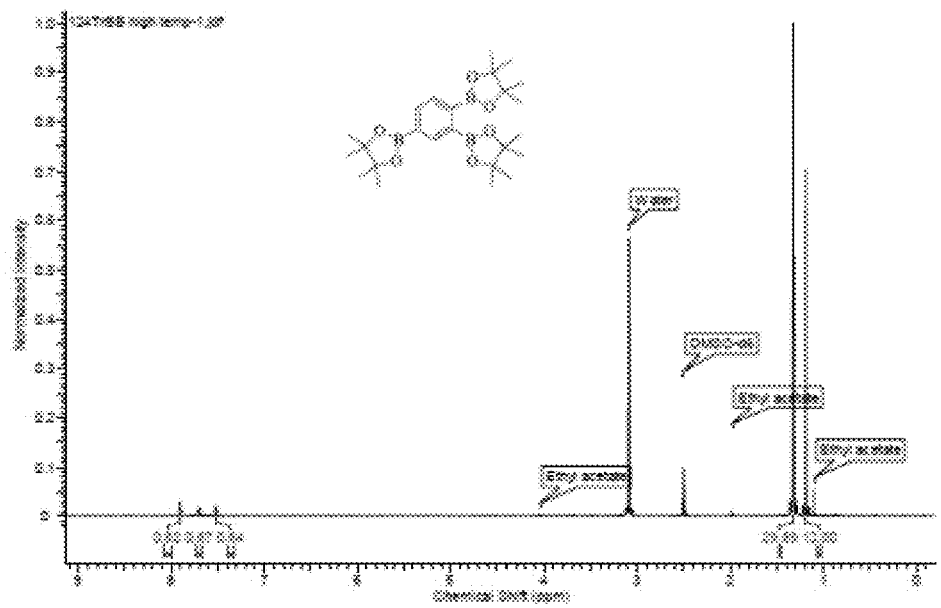
FIG. 10B illustrates $^1$H NMR results for 124TrBB.
Figure 10C:
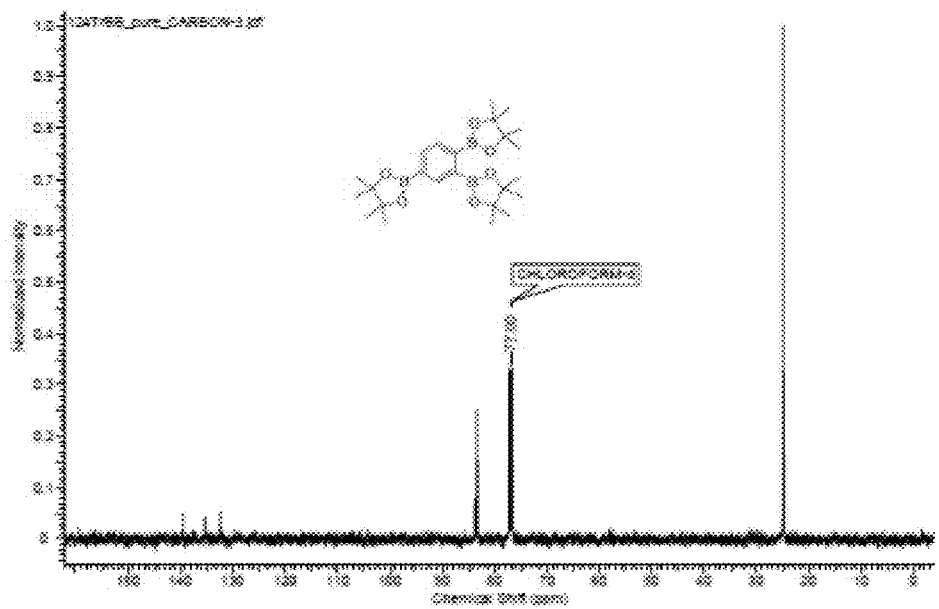
FIG. 10C illustrate illustrates $^{13}$C NMR results for 124TrBB.

FIG. 10A illustrates the formation of 124TrBB.

Trad. Conditions

In a flame-dried Schlenk tube under argon atmosphere, 1,2,4-tribromobenzene (200 mg, 0.64 mmol) and $B_2Pin_2$ (731.3 mg, 2.88 mmol) were dissolved in 20 ml 1,4-dioxane. Flame dried KOAc (471.1 mg, 4.8 mmol) was added quickly to the mixture followed by $PdCl_2$ (dppf) (15.5 mg, 0.029 mmol). The mixture was heated at 90° C. overnight. The progress of reaction was tracked by TLC (9 hexanes: 1 ethyl acetate) and visualization was achieved in an iodine chamber. Two spots (Rf 0.20 and Rf 0.25) were observed and heating was stopped to allow cooling to room temperature. 20-30 ml ethyl acetate was added to quench the reaction. 30 ml DI water was added to extract the aqueous phase, 30 ml brine (2×) was used to wash the organic phase, and it was dried over anhydrous $MgSO_4$ and filtered. After concentrating down the filtrate, hexanes:ethyl acetate (9:1) mixture was used to elute Rf 0.2 by silica column chromatography to yield a white powder (280 mg, 96%). 1H NMR at 80° C. (300.0 MHz, DMSO-d): δ 7.91 (s, 1H; CH), δ 7.70 (d, 1H; CH), δ 7.52 (d, 1H; CH), δ 1.34 (s, 12H; CH3), δ 1.33 (s, 12H; CH3), δ 1.19 (s, 12H; CH3). 13C {1H} NMR (75.5 MHz, CDCl3): δ 139.48 (CH), δ 135.47 (CH), δ 132.41 (CH), δ 83.44 (CCH3), δ 83.69 (CCH3), δ 83.480 (CCH3), δ 25.02 (CH3), n.o. (CB).

MHC 1,3,5-tribromobenzene (500 mg, 1.59 mmol) and $B_2Pin_2$ (1.82 g, 7.15 mmol) were added to a 20 ml microwave flask. Flame dried KOAc (1.17 g, 11.9 mmol) and $PdCl_2$ (dppf) (51.9 mg, 0.064 mmol) were added quickly to the flask. After adding 12 ml 1,4-dioxane, the flask was capped tightly and run at 130° C. for 1 hr. TLC (9 hexanes: 1 ethyl acetate) showed there were two spots Rf 0.2 and Rf 0.25. The mixture was cooled to room temperature and 30 ml ethyl acetate was added to quench the reaction. 30 ml DI water was added to extract the aqueous phase and 30 ml brine (2×) was used to wash the organic phase, dried over anhydrous $MgSO_4$ and filtered. After concentrating down the filtrate, hexanes:ethyl acetate (9:1) mixture was used to elute Rf 0.2 in silica column chromatography to yield a white powder (600 mg, 83%).

$^1$H and $^{13}$C NMR for Samples 4 and 5 can be found in FIGS. 9 (B-C) and 10 (B-C), respectively. As with the TBP molecule, 124TrBB also provided $^1$H NMR spectra with high integration ratios between the aliphatic and aromatic protons. The issue was addressed by running the NMR experiment in d6-DMSO (rather than CDCl3) at 80° C. (rather than room temperature). Also GC/MS results confirmed the formation and purity of 124TrBB. Generally, the yield for conventional heating was slightly improved (except for sample 6) over the microwave approach (Table 2).

Synthesis and Analysis of Sample 6 in FIG. 4 1,2, 4,5-tetrakis(4,4,5,5-tetramethyl-1,3,2-dioxaborolan-2-yl)benzene (TBB)

Figure 11A:
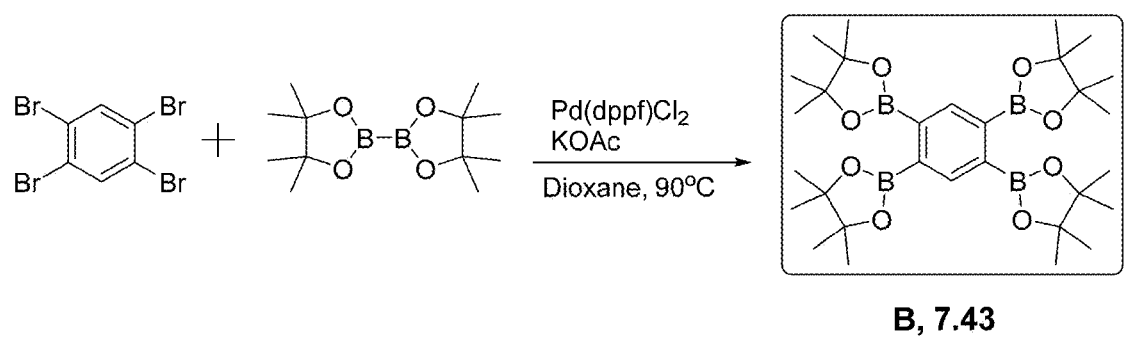
FIG. 11A illustrates the formation of 1,2,4,5-tetrakis(4,4,5,5-tetramethyl-1,3,2-dioxaborolan-2-yl)benzene (TBB)

FIG. 11A illustrates the formation of TBB.

Trad. Conditions

In a flame-dried Schlenk tube under argon atmosphere, 1,2,4,5-tetrabromobenzene (380 mg, 0.97 mmol) and $B_2Pin_2$ (1.48 g, 5.82 mmol) were dissolved in 20 ml 1,4-dioxane. Flame dried KOAc (952.1 mg, 9.70 mmol) was added quickly to the mixture followed by $PdCl_2$ (dppf) (23.6 mg, 0.030 mmol). The mixture was heated at 90° C. overnight. The progress of reaction was tracked by TLC (9 hexanes: 1 ethyl acetate) and visualization was achieved in an iodine chamber. Two spots (Rf 0.20 and Rf 0.25) were observed and heating was stopped to allow cooling to room temperature. 20-30 ml ethyl acetate was added to quench the reaction. 30 ml DI water was added to extract the aqueous phase, 30 ml brine (2×) was used to wash the organic phase, and it was dried over anhydrous $MgSO_4$ and filtered. After concentrating down the filtrate, hexanes:ethyl acetate (9:1) mixture was used to elute Rf 0.25 in silica column chromatography to yield a white powder. Alternatively, after concentration of the filtrate, both fractions were collected by filtering through a silica chromatography column, with elution by hexanes: ethyl acetate (7:3) mixture. The mixture was vacuum dried and 20 ml hexanes was added and left in the fridge overnight. The precipitate was collected by filtration (202 mg, 36%). 1H NMR (300.0 MHz, CDCl3): δ 7.89 (s, 2H; CH), δ 1.36 (s, 36H; CH3). 13C {1H} NMR (75.5 MHz, CDCl3): δ 137.90 (CH), δ 83.84 (CCH3), δ 24.99 (CH3), n.o. (CB).

MHC 1,2,4,5-tetrabromobenzene (500 mg, 1.27 mmol) and $B_2Pin_2$ (1.94 g, 7.63 mmol) were added to a 20 ml microwave flask. Flame dried KOAc (1.25 g, 12.7 mmol) and $PdCl_2$ (dppf) (41.6 mg, 0.051 mmol) were added quickly to the flask. After adding 12 ml 1,4-dioxane, the flask was capped tightly and run at 130° C. for 1 hr. TLC (9 hexanes: 1 ethyl acetate) showed there were two spots Rf 0.2 and Rf 0.25. The mixture was cooled to room temperature and 30 ml ethyl acetate was added to quench the reaction. 30 ml DI water was added to extract the aqueous phase, 30 ml brine (2×) was used to wash the organic phase, and it was dried over anhydrous $MgSO_4$ and filtered. After concentrating down the filtrate, hexanes:ethyl acetate (9:1) mixture was used to elute Rf 0.25 by silica column chromatography to yield a white powder. Alternatively, after filtrate concentration, both fractions were collected by filtering through a silica chromatography column, with elution by a hexanes: ethyl acetate (7:3) mixture. The mixture was vacuum dried, and 20 ml hexanes was added and left in the fridge overnight. The precipitate was collected by filtration to yield a white powder (250 mg, 41%).

Figure 11B:
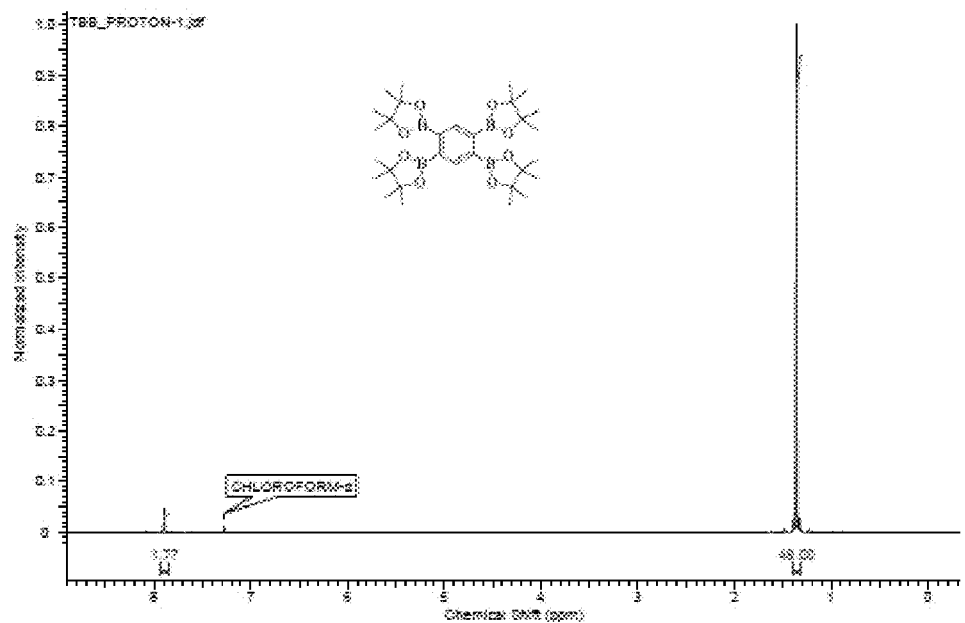
FIG. 11B illustrates $^1$H NMR results for TBB.
Figure 11C:
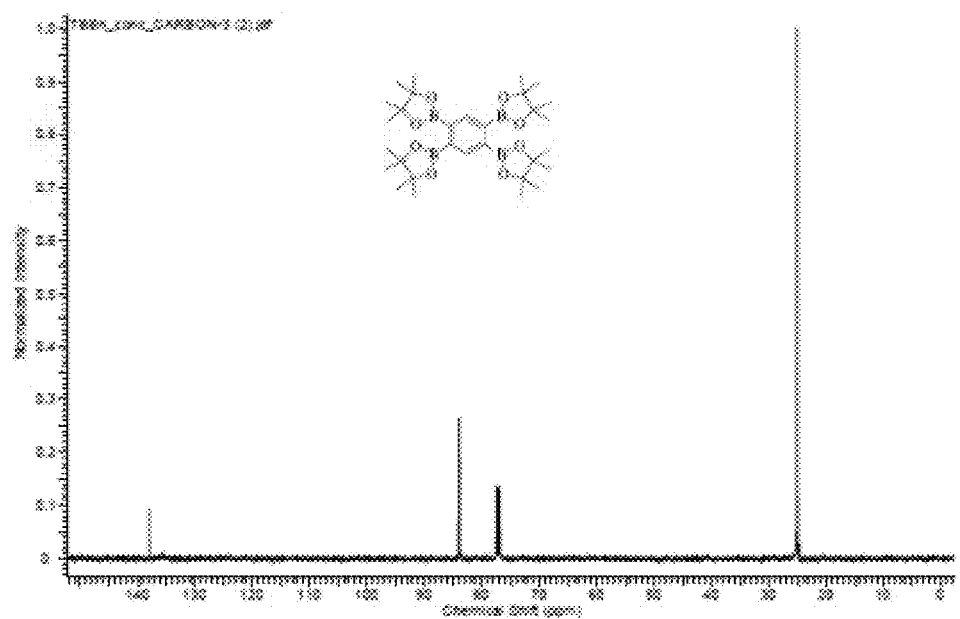
FIG. 11C illustrate illustrates $^{13}$C NMR results for TBB.

Sample 6 (FIG. 4, TBB) was helpful in understanding the lack of accurate NMR spectra for TBP since its aliphatic to aromatic proton ratio is higher (48:2 to 48:6). However, both $^1$H and $^{13}$C NMR unambiguously confirmed the synthesis of this molecule (FIGS. 11B and 11C, respectfully). The crystal structure and two-step reaction synthesis of this molecule was published by Wagner et al.

Scintillation and Neutron Capture Efficiency

Figure 12:
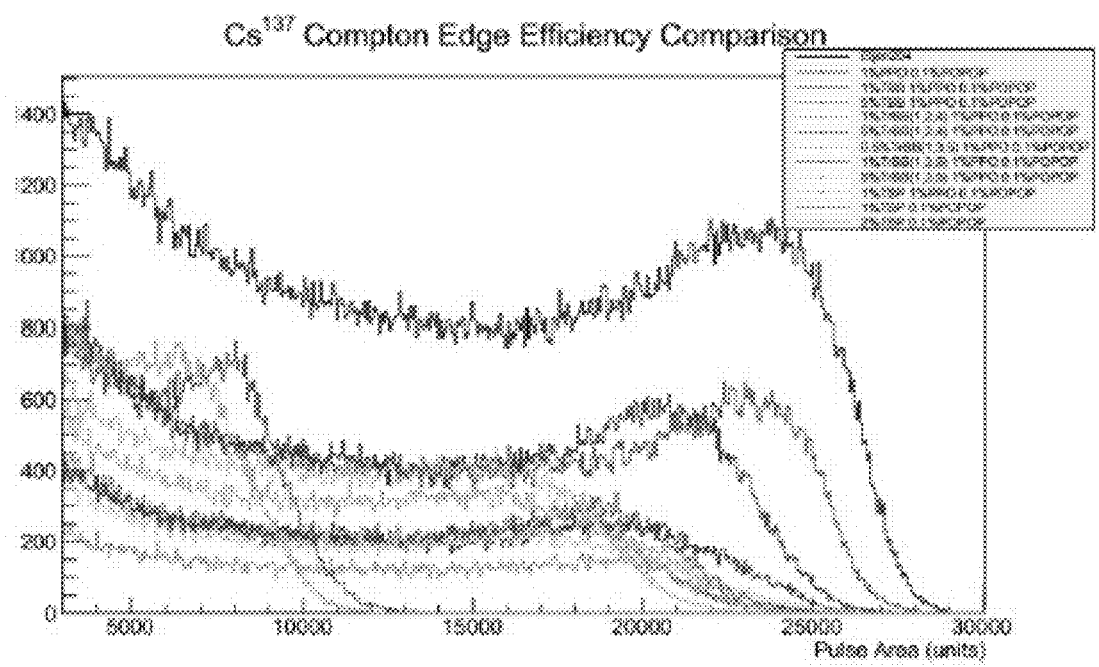
FIG. 12 illustrates the Cs137 Compton Edge Efficiency for a variety of samples.

FIG. 12 illustrates the Cs137 Compton Edge Efficiency for a variety of samples. FIG. 12 illustrates the light yield of various boron compound containing samples as compared a prepared control sample and EJ-204, which is a commercial Scintillator. FIG. 12 illustrates that the majority of the samples incorporating the boron compounds of the invention perform similar to commercial samples.

Effectiveness of 135TrBB

Figure 13:
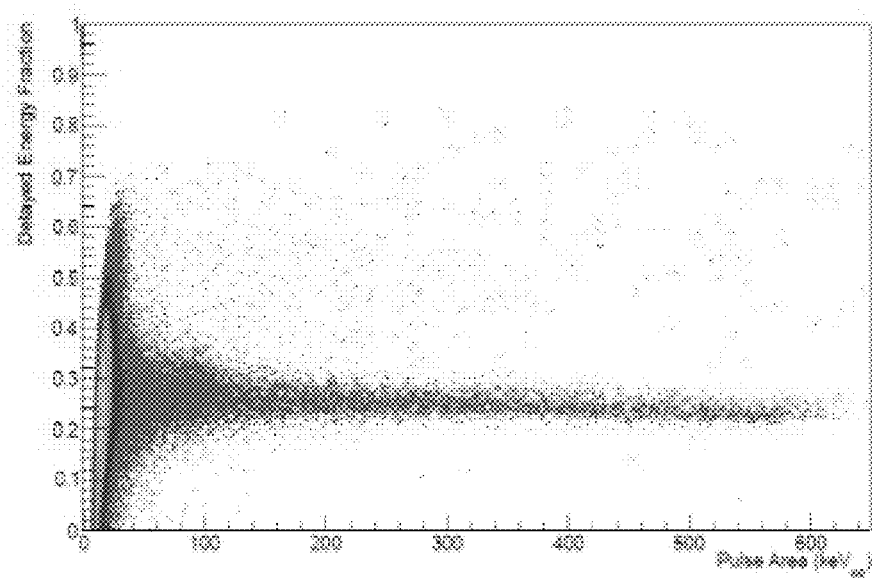
FIG. 13 illustrates the response of a plastic scintillator with 1% 135TrBB to gamma and neutron sources.
Figure 14:
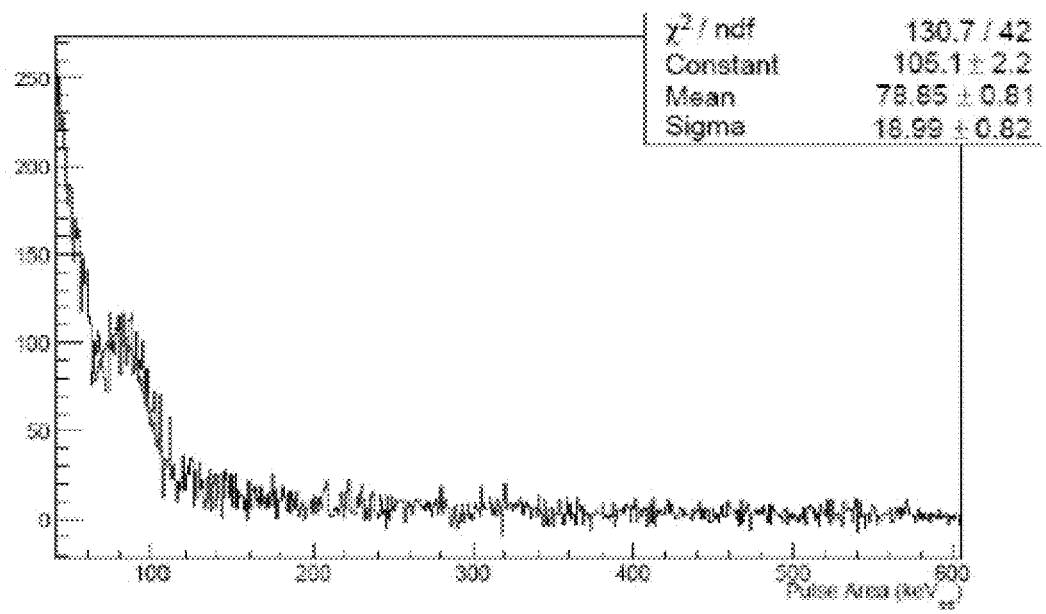
FIG. 14 illustrates the response of a plastic scintillator comprising 1% 135 TrBB with gamma shielding lead.

FIG. 13 illustrates the response of a plastic scintillator with 1% 135TrBB to gamma and neutron sources, while FIG. 14 illustrates the response of a plastic scintillator comprising 1% 135 TrBB with gamma shielding lead. Both figures illustrate that 1% 135 TrBB is effective in detecting gamma and neutron sources.

Figure 15:
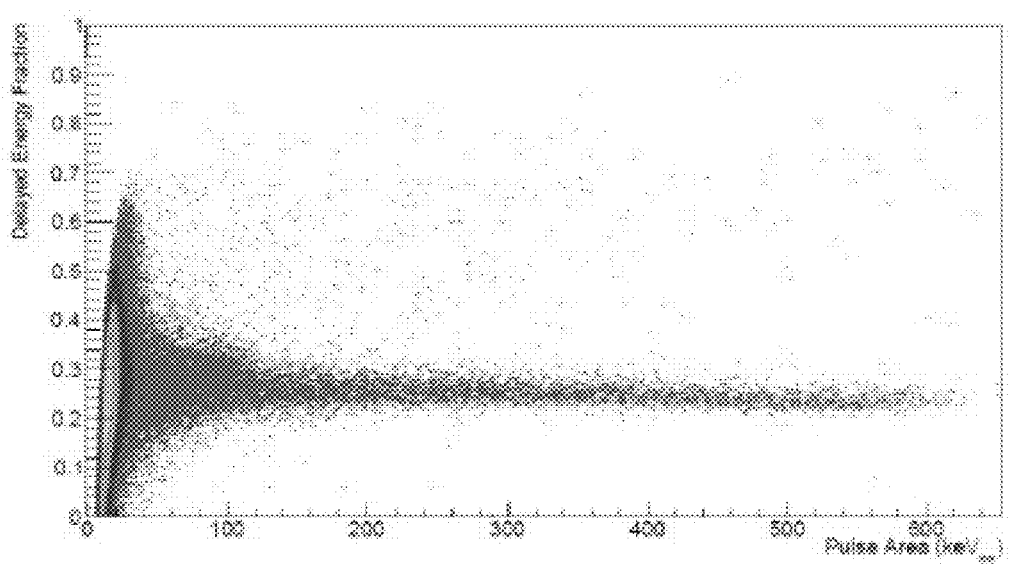
FIG. 15 illustrates the response of a plastic scintillator with 5% 135TrBB to gamma and neutron sources.
Figure 16:
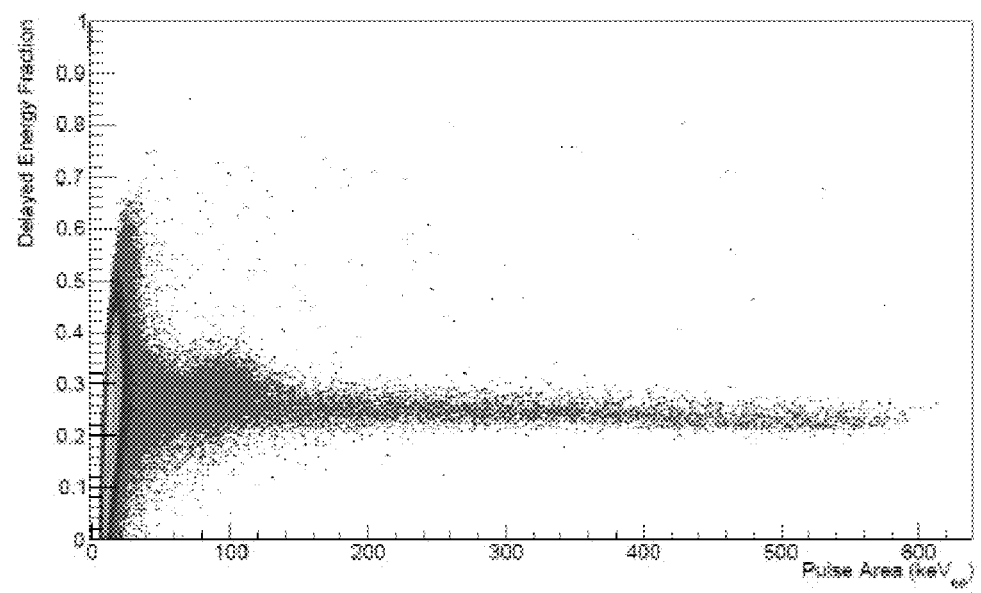
FIG. 16 illustrates the response of a plastic scintillator with 5% 124TrBB to gamma and neutron sources.
Figure 17:
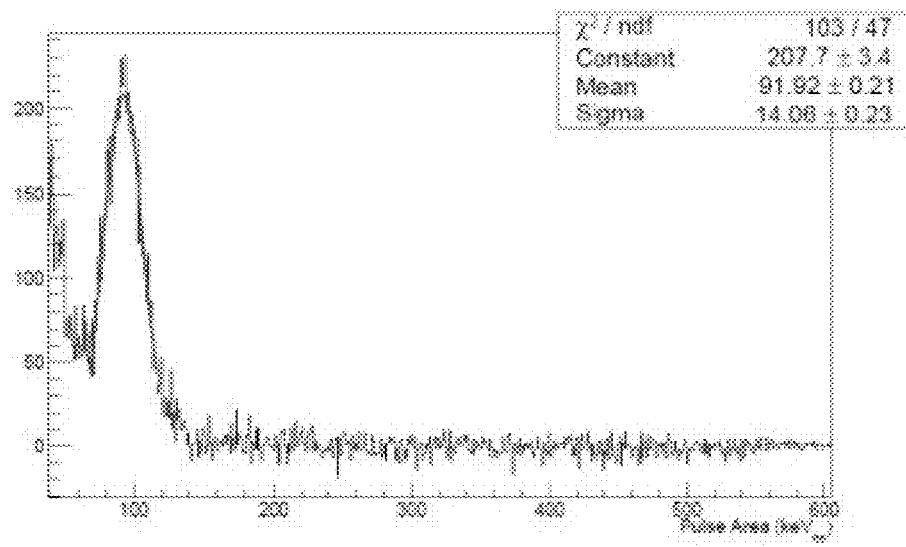
FIG. 17 illustrates the response of a plastic scintillator comprising 5% 124TrBB with gamma shielding lead.

FIG. 15 illustrates the response of a plastic scintillator with 5% 135TrBB to gamma and neutron sources, while FIG. 16 illustrates the response of a plastic scintillator with 5% 124TrBB to gamma and neutron sources. FIG. 17 illustrates the response of a plastic scintillator comprising 5% 124TrBB with gamma shielding lead. These figures illustrate that materials are effective in detecting gamma and neutron sources.

Optical Clarity

Figure 18:
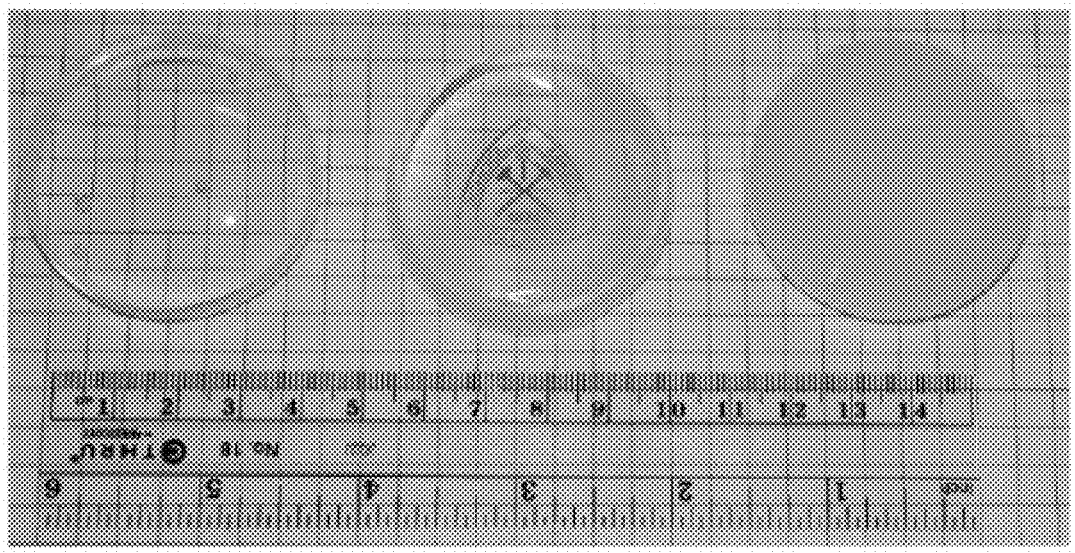
FIG. 18 illustrates disc of samples ii, iii, and iv discussed in Table 6.

The optical clarity of samples as a function of the amount of the neutron sensitive material was testing. FIG. 18 illustrates disc samples ii, iii, and iv, which incorporate 0.5, 1.0, and 5 wt. % of 135TrBB in 1 wt. % PPO, 0.1 wt. % POPP and 93.9 wt. % poly(vinyltoluene). Sample ii is transparent, while sample iii is slightly opaque and sample iv is completely opaque.

Figure 23:
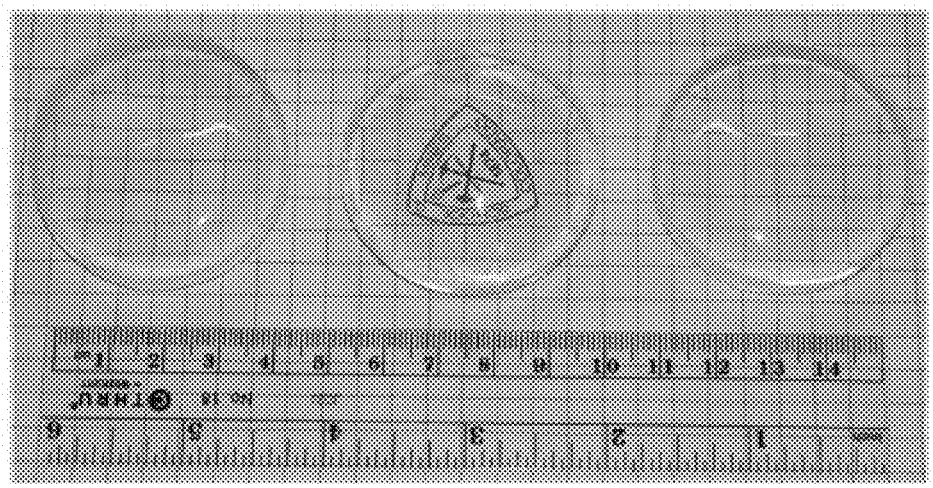
FIG. 23 illustrates disc samples of containing TBP.

The discs as illustrated in FIG. 18 (and other discs illustrated in FIGS. 19, 20, and 23) were prepared by mixing the calculated amounts of 2,5-diphenyl oxazole (PPO), 1,4-bis(5-phenyloxazol-2-yl) benzene (POPOP), boron based materials, and azobisisobutyronitrile (AIBN) and dissolving the mixture in the liquid 4-vinyltoluene monomer. The clear solution was degassed by gently bubbling with argon gas for 15-30 min. The solution was then bulk polymerized in an oil bath or an argon-filled vacuum oven at about 80° C. for about 96 hours, followed by about 90° C. for about 12 hours. The sample was cooled to room temperature and the glass bottle was broken with a mallet, giving a clear polymer disk of scintillating polymer. The sample was machined down to one flat side (meniscus side) using 100 grit sandpaper by hand or by belt depending on its mechanical and thermal stability. Then, the sample was polished using 150, 220, 300, 400, 600 and 600 wet-grit sandpapers. The final touches of polishing was done on a loose-cotton buffer wheel using white abrasive polishing compound and finished with blue buffing compound. Each sample has an about 4.7 cm diameter and is about 1.1-1.3 cm thick.

Figure 19:
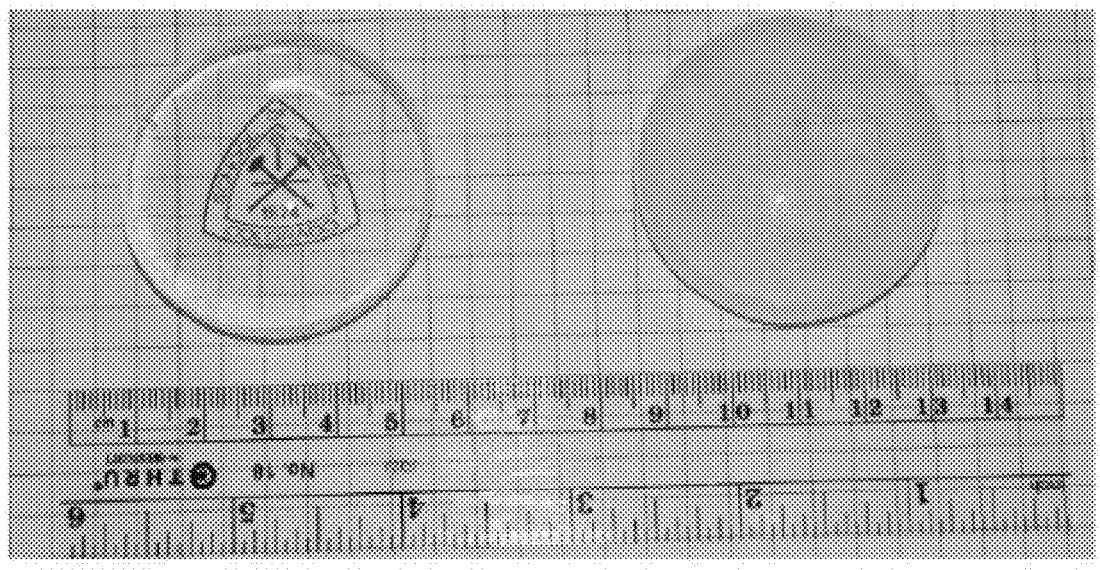
FIG. 19 illustrates discs of samples vii and viii incorporating 1 or 5 wt. % of TBB (Table 6)
Figure 20:
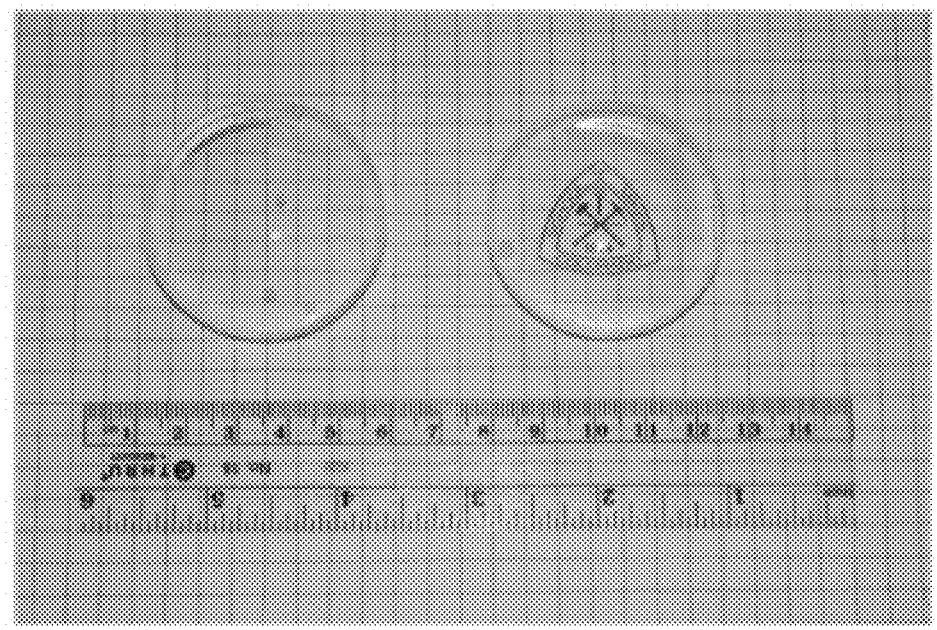
FIG. 20 illustrates discs of samples v and vi discussed in Table 6.

FIG. 19 illustrates samples vii and viii incorporating 1 or 5 wt. % of TBB, respectively. Sample vii is transparent, while sample viii is opaque.

Plastic Scintillators

Plastic scintillators are a composite of a polyvinyl toluene (PVT) that absorbs radiation energy and transfers this energy mainly to a primary dopant (PPO) via Förster resonance energy transfer (FRET). The PPO emission is then with nearly 100% efficiency absorbed by a wavelength shifter (POPOP) that has an efficient fluorescence peak matched to the photomultiplier tube (PMT) sensitivity.

Table 4 illustrates the optimization of a boron additive ($B_2Pin_2$) in PVT. The total mass of each sample was approximately 20.0 grams. The primary dopant was PPO and the weight percentage of the primary dopant was 1 wt. %. The wavelength shifter was POPOP and the weight percent was 0.1 wt. %.

TABLE 4

| Sample | $B_2Pin_2$ (wt. %) | Nat-B content (wt. %) | 10B content (wt. %) |
|---|---|---|---|
| 1 | — | — | — |
| 2 | 2 | 0.17 | 0.03 |
| 3 | 5 | 0.43 | 0.09 |
| 4 | 10 | 0.85 | 0.17 |
| 5 | 11.75 | 1 | 0.2 |
| 6 | 15 | 1.28 | 0.25 |
| 7 | 20 | 1.7 | 0.34 |

Figure 25:
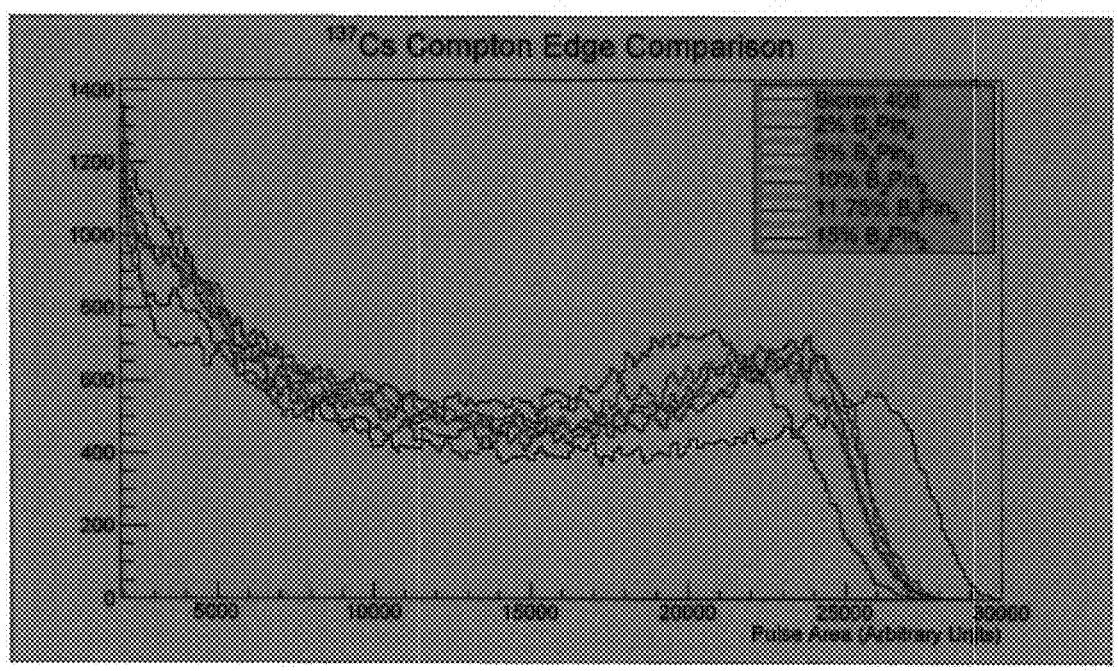
FIG. 25 illustrates the number of counts v. uncalibrated pulse area in scintillating PVT based samples as measured through exposure to a 137 Cs gamma-source using the PMT bias value.

FIG. 25 illustrates the number of counts v. uncalibrated pulse area in scintillating PVT based samples as measured through exposure to a 137 Cs gamma-source using the PMT bias value. The $B_2Pin_2$ concentration appears to have little effect on light output when added at the 10 wt. % level. The 15 wt. % sample appears to be approaching the solubility limit of B2Pin2.

A second set of samples was prepared and tested with the intent of achieving PSD in our samples using the scintillating fluor over-doping method originally developed by Brooks et al. (IRE Transactions on Nuclear Science NS-7 (1960) 35) which in recent years inspired further work in several laboratories. The plastic compositions with over-doped PPO and 1% boron additive compositions used in this sample set are provided in Table 5.

TABLE 5

| | | Primary dopant | | Wavelength shifter | | $B_2Pin_2$ | Crosslinker |
|---|---|---|---|---|---|---|---|
| Sample | Matrix | Name | wt. % | Name | wt. % | wt % | Wt % |
| 1 | PVT | PPO | 10 | POPOP | 0.1 | 11.75 | N/A |
| 2 | PVT | PPO | 15 | POPOP | 0.1 | 11.75 | 0.1 |
| 3 | PVT | PPO | 20 | POPOP | 0.1 | 11.75 | 0.1 |

Figure 26:
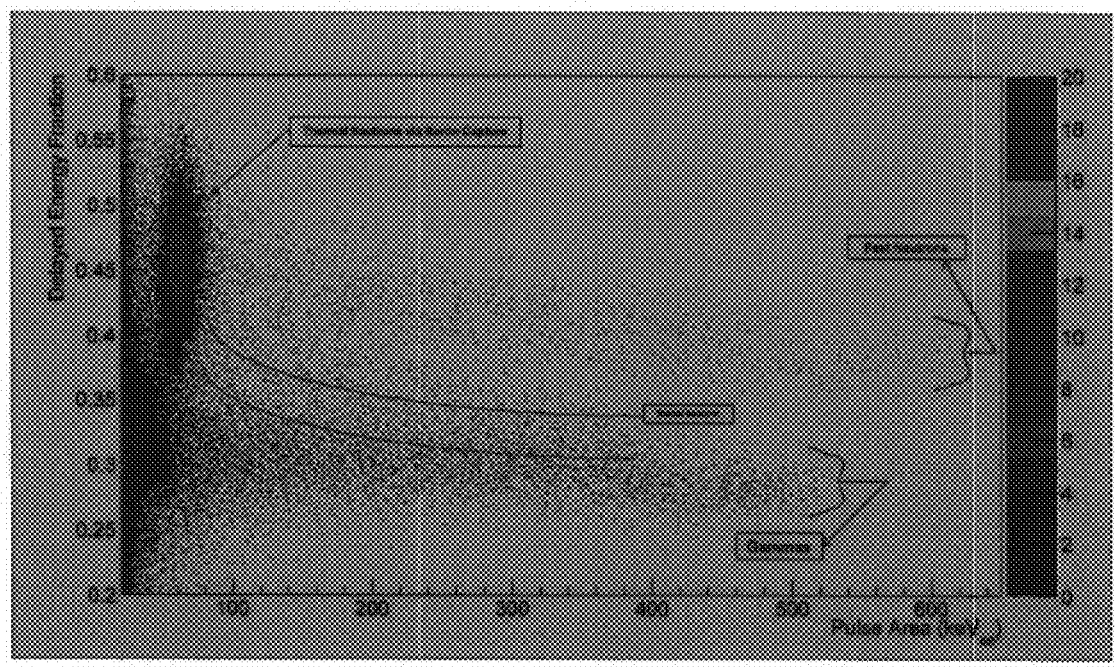
FIG. 26 illustrates spectrum from the thermalized $^{244}$Cm/$^{13}$C neutron source.
Figure 27:
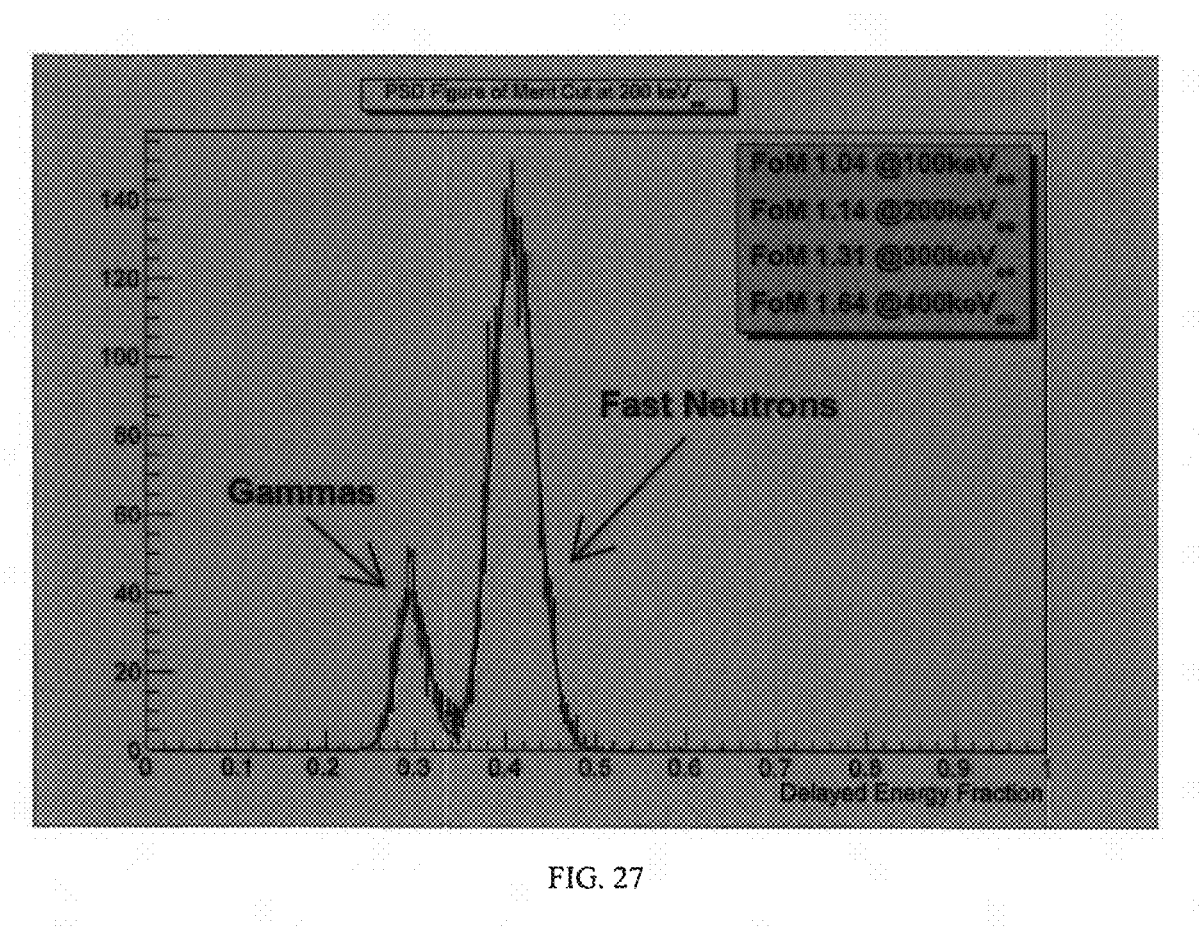
FIG. 27 illustrates various PSD figures of merit (FoM) numbers using the fast neutron spectrum.

The 11.75 wt % $B_2Pin_2$ concentration is equivalent to 1 wt % natural boron content, and was chosen to be below the solubility limit of the $B_2Pin_2$/PVT system. The plastic samples were polished and prepared as described earlier and their detector response properties analyzed with the same radioactive source configurations. In our tests significant PSD was not quantifiable until the sample contains at least 10% PPO. Meaningful separation between neutrons and gammas in our energy range of interest (of order 100 $keV_{ee}$) was not seen until higher concentrations (~20%). The $B_2Pin_2$ content combined with the high amount of PPO necessary to achieve PSD leads to the polymerization kinetics being significantly altered producing plastic samples that are soft. In order to address this concern, divinylbenzene (DVB), a crosslinking agent, was introduced into the sample solution prior to polymerization. With the crosslinking agent added, the plastic sample containing 20 wt % PPO 0.1 wt % POPOP and 11.75 wt % $B_2Pin_2$ was at a "hardness" level that could be cut and prepared for our standard detector test. The Compton Edge of the $^{137}$Cs spectrum was 98% light output of a commercial plastic scintillator (Saint Gobain Crystals, BC-408). However, the PPO over-doping method appeared to worsen the alpha quenching significantly and the $^{10}$B thermal neutron capture peak was located at app. 60 $keV_{ee}$. The resulting spectrum from the thermalized $^{244}$Cm/$^{13}$C neutron source is detailed in FIG. 26 and various PSD figures of merit (FoM) numbers using the fast neutron spectrum are illustrated in FIG. 27. The measured FoM at 100 $keV_{ee}$ of 1.04 compares well to the published value of 0.9 at 120 $keV_{ee}$ for the commercial EJ-299-33, which is based on the addition of carboranes and also presumably uses the PPO over-doping method. (S. A. Pozzi et al., Nuclear Instruments and Methods in Physics Research Section A: Accelerators, Spectrometers, Detectors and Associated Equipment 723 (2013) 19).

Table 6 illustrates the composition of plastic scintillators prepared incorporating the boron materials (samples 3-6 of FIG. 4) into the PVT matrix. 0.1 wt % of POPOP was used. The total mass of each sample was 20.0 g. When TBP was listed as the primary dopant, it acted as both the primary dopant and the boron source. The first eight samples were colorless with intense blue luminescence under UV excitation. As TBP has a pale yellow color, samples ix-xi were optically clear with a yellowish color and strong blue luminescence under UV excitation.

TABLE 6

| Sample | Vinyl toluene | Wavelength Shifter | | Boron Source | |
|---|---|---|---|---|---|
| | | Name | (wt. %) | Name | (wt. %) |
| i | 98.9 | PPO | 1.0 | — | — |
| ii | 98.4 | PPO | 1.0 | 135TrBB | 0.5 |
| iii | 97.9 | PPO | 1.0 | 135TrBB | 1.0 |
| iv | 93.9 | PPO | 1.0 | 135TrBB | 5.0 |
| v | 97.9 | PPO | 1.0 | 124TrBB | 1.0 |
| vi | 93.9 | PPO | 1.0 | 124TrBB | 5.0 |
| vii | 97.9 | PPO | 1.0 | TBB | 1.0 |
| viii | 93.9 | PPO | 1.0 | TBB | 5.0 |
| ix | 98.9 | TBP | 1.0 | TBP | 1.0 |
| x | 97.9 | TBP | 2.0 | TBP | 2.0 |
| xi | 97.9 | PPO | 1.0 | TBP | 1.0 |

The light output of these samples (4.7 cm diameter×1.1-1.3 cm thickness) was compared to a commercial scintillator (EJ-204) of approximately the same dimensions prepared by Eljen Technology. The control (Table 7, sample i) resulted in 95% of the light output compared to the commercial scintillator.

A summary of light output of samples i-xi compared to EJ-204 and their properties are illustrated in Table 7. The high average molecular weight (Mn and Mw) of the samples (as determined by GPC using poly(styrene) calibration standards) is indicative of complete polymerization of the scintillator samples, hence minimal inhibition of polymerization by the added components. As seen in column 5 (Table 7), the signal produced by the 1.48 MeV alpha and 0.48 MeV 7Li ion (products of thermal neutron reaction with $^{10}$B) is quenched to produce scintillation light equivalent in amplitude from an electron with an energy of 60-100 keV depending on sample composition.

TABLE 7

| Sample | Comparison to EJ 204 | B Content (wt. %) | $^{10}$B Content (wt. %) | Neutron Capture (keVee) | Mn (MDa) | Mw (MDa) | PDI |
|---|---|---|---|---|---|---|---|
| i | 95 | — | — | — | 1.37 | 3.52 | 2.57 |
| ii | 74 | 0.035 | 0.007 | No capture | 1.20 | 2.36 | 1.96 |
| iii | 78 | 0.070 | 0.014 | 78.8 ± 0.8 | 1.29 | 3.44 | 2.66 |
| iv | 78 | 0.356 | 0.071 | 73.1 ± 2.0 | 0.69 | 1.54 | 2.24 |
| v | 77 | 0.070 | 0.014 | 72.1 ± 2.6 | 0.91 | 2.59 | 2.73 |
| vi | 81 | 0.356 | 0.071 | 91.9 ± .02 | 1.64 | 2.88 | 2.22 |
| vii | 87 | 0.075 | 0.015 | 74.9 ± 2.0 | 0.32 | 0.81 | 2.58 |
| viii | 76 | 0.370 | 0.074 | 82.6 ± 0.7 | 1.26 | 4.39 | 3.47 |
| ix | 36 | 0.065 | 0.013 | No capture | 1.35 | 3.38 | 2.51 |
| x | 31 | 0.130 | 0.026 | No capture | 0.79 | 1.96 | 2.49 |
| xi | 70 | 0.065 | 0.013 | 69.8 ± 1.1 | 1.72 | 4.72 | 2.75 |

Samples ii-iv (FIG. 18) contain increasing amounts of 135TrBB (FIG. 4, sample 4). As expected, capture of thermal neutrons was not observed for the 0.5% sample of this compound due to the low concentration of 10B (0.007% wt) (sample ii). Increasing the amount of 135TrBB to 1% showed thermal capture as well as increased light output (sample iii), while increasing the amount to 5% wt reached the solubility limit of 135TrBB in PVT (sample iv) resulting in an opaque sample. The symmetrical nature of the compound likely contributed to its crystallization in PVT at higher loadings.

Figure 21:
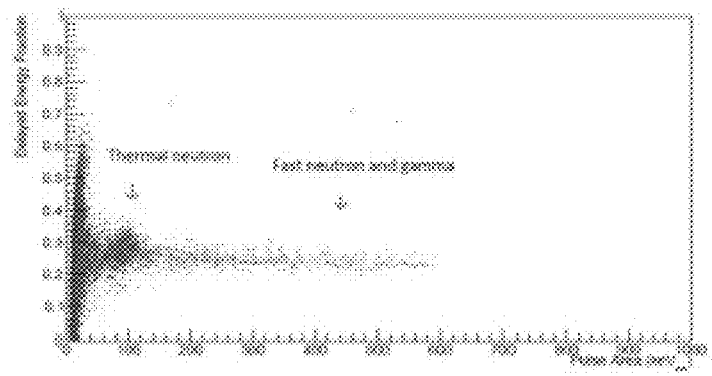
FIG. 21 illustrates a one minute collection of data using the 244Cm/13C source for 5% 124TrBB.

124TrBB that has a more unsymmetrical structure but the same boron content as 135TrBB. Samples v and vi both had the best optical clarity with 124TrBB (FIG. 4, sample 5) as the boron additive (FIG. 20) indicating enhanced solubility of 124 versus 135TrBB. Increasing the concentration of 124TrBB from 1 wt. % to 5 wt. % increased both the light output as well as thermal neutron capture (Table 7, sample v and vi). FIG. 21 illustrates a one minute collection of data using the 244Cm/13C source for 5% 124TrBB (Table 7, sample vi), that already shows distinct neutron capture above the background noise. This sample resulted in a 10B thermal neutron capture signal at approximately 92 keVee with 81% relative light output. The inventors believe this capture signal is the highest thermal neutron capture signal observed from a boron doped plastic scintillator.

Figure 22:
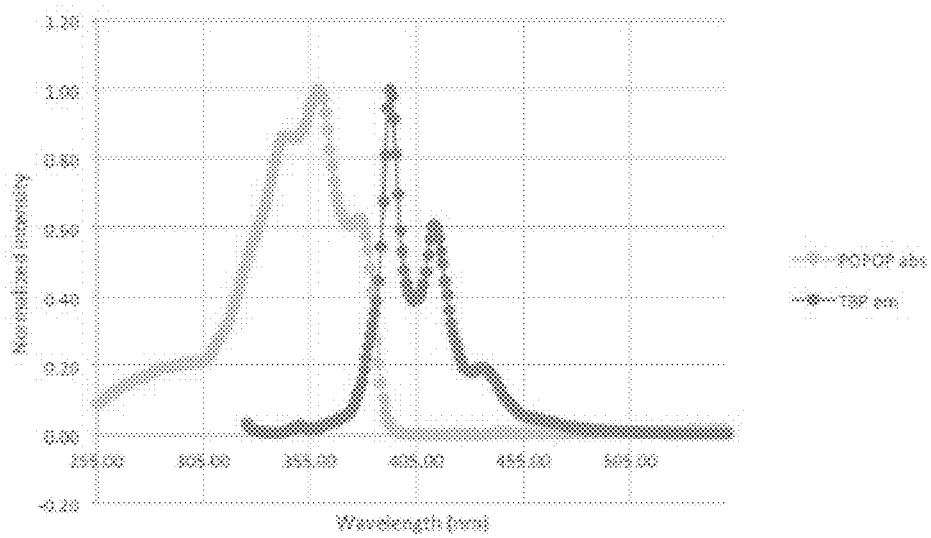
FIG. 22 illustrates energy transfer from the matrix to TBP and wavelength shifter of samples containing TBP.
Figure 24:
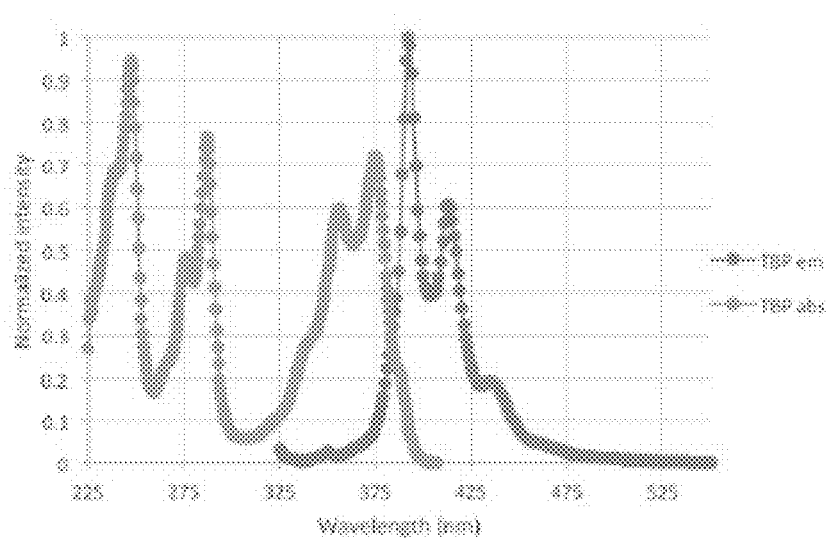
FIG. 24 illustrates absorption and emission spectra for a sample containing TBP.

Samples vii and viii both had TBB (FIG. 4, sample 6) as boron additive. The solubility limit of this compound was the lowest in PVT. For example, 1% wt loadings showed crystallization as shown in (FIG. 19). Despite its poor solubility, it showed a clearly visible boron capture signal even at 1% (Table 7, sample vii). Increasing the concentration to 5% wt decreased the optical clarity significantly as shown in FIG. 19. The decrease in light output compared to the standard was due to attenuation of light by increased dopant concentration. This effect is in agreement with literature reports. Utilizing TBP (FIG. 4, sample 3) as both a boron source and primary dopant resulted in lower light output and neutron capture likely due to unoptimized energy transfer from the matrix to TBP and wavelength shifter (FIG. 22). The dramatic drop in light output also caused the capture reaction to be buried in the electronic background. The issue was resolved by only utilizing TBP as a boron source and using PPO as the primary dopant (Table 7, sample xi). This sample showed a dramatic increase in light output and the thermal neutron induced reaction signal became clearly visible (Table 7, sample xi). All of the samples containing TBP (FIG. 23) were slightly yellow due to its pale yellow color. Absorption and emission spectra for TBP can be found in FIG. 24.

All numbers discussed in the Specification are approximate. Furthermore, ranges are discussed in the Specification. Sub ranges within the ranges or particular values within the range can be used and would be understood by one skilled in the art. Furthermore, different embodiments are discussed in the Specification that can be used with other embodiments of the invention.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

The invention claimed is:

1. A method of preparing a neutron sensitive material that is adapted to measure neutron or gamma radiation, comprising:
    providing a boron containing material; providing a dopant, comprising a scintillating fluorescent or scintillating phosphorescent, wherein the dopant is of the formula $C_xH_yB_zO_a$ and wherein the dopant does not contain $^3$He,
    where x is between 22 and 40,
        y is between 21 and 54,
        z is between 1 and 4,
        a is between 2 and 8;
    providing a plastic material;
    reacting the boron containing material, the dopant, and the plastic material to form a clear mixture.

2. The method of claim 1, further comprising mixing a catalyst, a base, and an arylhalide with the clear mixture.

3. The method of claim 2, wherein the catalyst is a palladium, a nickel, an iridium, a copper, a ruthenium, a platinum and combinations thereof.

4. The method of claim 2, wherein the mixing occurs in the absence of oxygen.

5. The method of claim 1, wherein the boron containing material is at least one of $B_2Pin_2$, TBP, 124TrBB, 135TrBB, and TBB.

6. The method of claim 1, wherein the neutron sensitive material is a chemical comprising boron and oxygen.

7. The method of claim 1, wherein the clear mixture is subjected to a temperature between about 75° C. to about 95° C.

8. The method of claim 7, wherein the clear mixture is exposed to the temperature for between about 720 minutes to about 2160 minutes.

9. The method of claim 7, wherein the clear mixture is maintained at the temperature in an oven.

10. The method of claim 1, wherein the clear mixture is heated to a temperature between about 120° C. to about 135° C. in a microwave.

11. The method of claim 1, wherein an excess of the boron containing material is provided in the clear mixture.

12. The method of claim 1, wherein a ratio of the boron containing material to the plastic material is between about 1:5 to about 1:99.

13. The method of claim 1, further comprising mixing the neutron sensitive material with a plastic material.

14. The method of claim 1, further comprising forming the boron containing material, a boron source and a plastic material.

15. The method of claim 1, further comprising providing an initiator selected from the group consisting of a poly (styrene), a poly(4-vinyltoluene), and a poly(methyl methacrylate); and
    reacting the initiator, the boron containing material, the dopant, and the plastic material to form the clear mixture.

16. A neutron sensitive dopant for use in neutron and gamma detection of the formula $C_xH_yB_zO_a$ and wherein the dopant does not contain $^3$He
    where x is between 22 and 40,
    y is between 21 and 54,
    z is between 1 and 4,
    a is between 2 and 8.

17. The neutron sensitive dopant of claim 16, wherein a chemical formula of the dopant is $C_{12}H_{24}B_2O_4$.

18. The neutron sensitive dopant of claim 16, wherein a weight percent of the boron is between about 3.29 to about 8.51.

19. A method of detecting neutrons, comprising: exposing an object or area suspected of containing neutrons to an apparatus, wherein the apparatus comprises a plastic and neutron sensitive dopant is of a chemical formula of formula $C_xH_yB_zO_a$ and does not contain $^3$He; and
    where x is between 22 and 40,
    y is between 21 and 54,
    z is between 1 and 4,
    a is between 2 and 8
    detecting a level of neutrons present in the object or area.

20. The method of detecting neutrons of claim 19, wherein the object or area is selected from an oil and gas operation, a person, a cargo material, a reactor area, a laboratory, and airport security.

* * * * *